(12) United States Patent
Shirai et al.

(10) Patent No.: US 9,769,442 B2
(45) Date of Patent: *Sep. 19, 2017

(54) INFORMATION DISPLAY APPARATUS

(71) Applicant: NEC Display Solutions, LTD., Tokyo (JP)

(72) Inventors: Akihiko Shirai, Kanagawa (JP); Kazuhisa Yanaka, Kanagawa (JP); Takeru Utsugi, Kanagawa (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,654

(22) Filed: Jul. 21, 2016

(65) Prior Publication Data

US 2017/0006268 A1    Jan. 5, 2017

Related U.S. Application Data

(63) Continuation of application No. 13/823,248, filed as application No. PCT/JP2011/005179 on Sep. 14, 2011, now Pat. No. 9,443,491.

(30) Foreign Application Priority Data

Sep. 14, 2010 (JP) ................................. 2010-206145

(51) Int. Cl.
   *G09G 5/10* (2006.01)
   *H04N 9/31* (2006.01)
   (Continued)

(52) U.S. Cl.
   CPC ........... *H04N 9/3182* (2013.01); *G03B 21/14* (2013.01); *G06F 3/1423* (2013.01); *G09G 3/002* (2013.01);
   (Continued)

(58) Field of Classification Search
   None
   See application file for complete search history.

(56) References Cited

U.S. PATENT DOCUMENTS

2002/0105483 A1    8/2002    Yamazaki et al.
2003/0118183 A1    6/2003    Struyk
(Continued)

FOREIGN PATENT DOCUMENTS

| JP | S 62-091926 A | 4/1987 |
| JP | H 9-101749 A | 4/1997 |
| JP | 2002-189546 A | 7/2002 |

OTHER PUBLICATIONS

International Search Report in PCT/JP2011/005179 dated Nov. 8, 2011 (English Translation Thereof).
(Continued)

*Primary Examiner* — Chad Dicke
(74) *Attorney, Agent, or Firm* — McGinn IP Law Group, PLLC

(57) ABSTRACT

A method for displaying information on a screen includes modifying tone values to compress the tone of a main image; projecting by a first projector the main image with compressed tones generated with a first polarization component; modifying tone values of a sub-image for correcting tones of the sub-image; generating a correction image; and projecting by a second projector the correction image with a second polarization component different from the first polarization component over the main image projected by the first projector such that the main image is buried by an overlapped projection of the main image and the correction image generated by using the sub-image and an offset value to provide the sub-image to a viewer with a naked eye and to provide the main image to another viewer with a polarizer.

8 Claims, 24 Drawing Sheets

(51) Int. Cl.
  *G03B 21/14*   (2006.01)
  *G06F 3/14*    (2006.01)
  *H04N 13/04*   (2006.01)
  *G09G 3/00*    (2006.01)
  *H04N 5/20*    (2006.01)
  *G09G 3/36*    (2006.01)
  *G09G 5/06*    (2006.01)
  *G09G 5/14*    (2006.01)
  *G03B 21/604*  (2014.01)

(52) U.S. Cl.
  CPC .............. *G09G 3/003* (2013.01); *G09G 5/10* (2013.01); *H04N 5/20* (2013.01); *H04N 9/3147* (2013.01); *H04N 9/3167* (2013.01); *H04N 13/0434* (2013.01); *H04N 13/0447* (2013.01); *H04N 13/0459* (2013.01); *G03B 21/604* (2013.01); *G09G 3/36* (2013.01); *G09G 5/06* (2013.01); *G09G 5/14* (2013.01); *G09G 2358/00* (2013.01); *H04N 2013/0463* (2013.01)

(56) References Cited

U.S. PATENT DOCUMENTS

2004/0021800 A1    2/2004   Yamazaki et al.
2011/0206285 A1    8/2011   Hodge et al.

OTHER PUBLICATIONS

U.S. Office Action in U.S. Appl. No. 13/823,248 dated Feb. 24, 2015.
U.S. Office Action in U.S. Appl. No. 13/823,248 dated Aug. 11, 2015.
U.S. Office Action in U.S. Appl. No. 13/823,248 dated Dec. 7, 2015.
Notice of Allowance in U.S. Appl. No. 13/823,248 dated May 2, 2016.

(A)

(B)

(A)

(B)

INFORMATION DISPLAY APPARATUS

The present application is a Continuation Application of U.S. patent application Ser. No. 13/823,248, filed on Mar. 14, 2013, which is based on and claims priority from PCT Application No. PCT/JP2011/005179 filed Sep. 14, 2011 and Japanese patent application No. 2010-206145, filed on Sep. 14, 2010, the entire contents of which is incorporated herein by reference.

TECHNICAL FIELD

The present invention relates to an information display apparatus for making audio-visually access to different images among different observers.

BACKGROUND ART

A display apparatus, which presents a white image when viewed by naked eyes and presents a display image when viewed a screen with a polarized plate having the same polarization direction with projection of the display image, is known (for example, Patent Literature 1 and Patent literature 2).

PRIOR ART LITERATURE

Patent Literature

Patent Literature 1: Japan Patent (Laid-Open) No. Heisei 9-166768 (columns 0025-0028, FIG. 2)
Patent Literature 2: Japan Patent (Laid-Open) No. 2005-92227 (columns 0023-0029, FIG. 2, FIG. 3)

SUMMARY OF INVENTION

Object to be Solved by Invention

However, the above display apparatus hides the display image by overlaying the white image on the display image such that there was a problem that observers with naked eyes could not see any image.

The present invention has been completed considering problems described above and the object of the present invention is to provide an information display apparatus which makes it possible to present a main image only to particular observers while presenting other images (sub-images) to other observers.

Means for Addressing Problem

In order to address the problem, according to one aspect of the present invention provides a method for displaying information on a screen by an information display apparatus. The method may comprise:

modifying tone values to compress the tone of a main image according to a formula (1);

$$b' = b \times \frac{a_{min}}{255} + U \qquad (1)$$

wherein b' and b are the luminance values of each pixel of each of the main image and $a_{min}$ is an offset value to be used when a sub-image tone value is modified and U is a parameter for correcting the luminance levels of projectors;

projecting by a first projector the main image with compressed tones generated with a first polarization component;

modifying tone values of a sub-image for correcting tones of the sub-image according to a formula (2);

$$a' = a \times \frac{255 - a_{min}}{255} + a_{min} + T \qquad (2)$$

wherein a' and a are the luminance values of each of pixel of each of a modified sub-image (A') and the original sub-image (A) and T is a parameter for correcting the luminance levels of projectors;

generating a correction image according to a formula (3);

$$c = (a'^\gamma - b'^\gamma)^{\frac{1}{\gamma}} \qquad (3)$$

wherein c is the luminance value of each pixel of the correction image and γ is the γ value of a projector for projecting a correction image; and projecting by a second projector the correction image with a second polarization component different from the first polarization component over the main image projected by the first projector such that the main image is buried by overlapped projection of the main image and the correction image generated by using the sub-image and the offset value to provide the sub-image to a viewer with naked eyes and to provide the main image to another viewer with a polarizer.

Further according to the present invention, the method may further comprises mutually converting luminance values of the image to intensities of the images projected on a screen, and the tone value comprises the tone value in the intensity converted by the luminance value of the image by conversion of the luminance values. Further according to the present invention, the second polarization component of the second projector may block the polarization component of the image projected by the second projector.

Further according to the present invention, the correction image allows the correction image to be viewed with the naked eye and allows the main image to be viewed through a polarized eyeglass which passes the polarization component of the image projected by the first projector while blocking the polarization component of the image projected by the second projector.

Further another aspect of the present embodiment, a program product including a storage medium tangibly storing a computer executable program for making a processor execute the method of the present embodiment d may be provided.

Technical Advantage of Invention

According to the present invention, the sub-image projected and multiplied may be viewed with the naked eyes and the main image may be viewed through a (polarized) eyeglass which passes the polarization component of the image projected by the first projection means while blocking the polarization component of the image projected by the second projection means. Thence, when only the observers making access to the main image uses the eyeglass, only such observer may view the main image while the other observers may view the sub-image.

EMBODIMENT FOR PRACTICING INVENTION

The present invention may be, for example, applied to the information display system etc. for allowing a plurality of observers to access audio-visually to images.

Example 1

Figure 1:
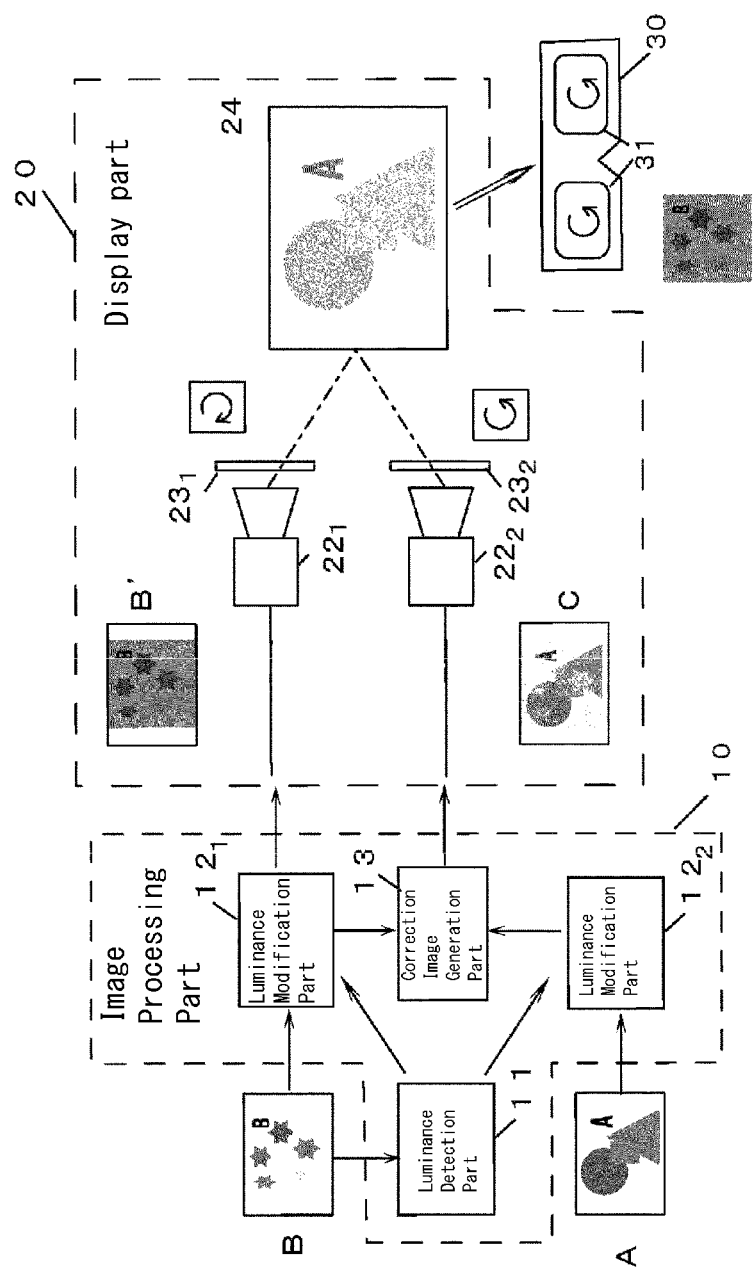
FIG. 1 A block diagram showing an assembled example of an information display system of Example 1 of the present invention.

(Whole Construction)
FIG. 1 shows a block diagram schematically illustrating the construction of the information display system of Example 1 of the present invention. The information providing system comprises the image processing part 10 which generates two different display images having different polarization direction; the one of the display image is the main image (B) presented to particular observer and the other is the sub-image (A) presented to the observer other than the particular observers, a display part 20 which displays the generated image generated by the image processing part 10 and the eyeglass 30 which is used by the particular observer (the observers allowing access to the main image) when the particular observer see the image displayed by the display part 20.

The image processing part 10 is realized by the execution of OS and application software in a information processing apparatus such as, for example, personal computer etc. and comprises the luminance detection part 11 for detecting the least luminance of the sub-image (A), the luminance modification part $12_1$, $12_2$ for modifying the luminance of the main image (B) and the sub-image (A), and the correction image generation part 13 for generating the correction image (C).

The display part 20 each comprises the luminance modification part 121, the projectors $22_1$-$22_2$ for projecting the image from the correction image generating part 13 on the screen 24, and polarization filters $23_1$-$23_2$ attached in front of each of the projectors $22_1$-$22_2$. For example, the polarization filter $32_1$ attached in front of the projector $22_1$ has a right circulating polarization and the polarization filter $32_1$ attached in front of the projector $22_2$ has a left circulating polarization. The screen 24 of the display part 20 is for example composed by a silver screen which reflects the projected light diffusely while keeping the polarization axis of the projected light.

In addition, the eyeglass 30 is attached with the polarization filter 31 which pass the polarized component of the image projected by the projector $22_1$ while not passing the polarized component of the image projected by the projector $22_2$. In the case of the silver screen, the projected light from the projector $22_1$ reflected by the screen 24 has the left circulating polarization which is opposite to the projected light (right circulating polarization) such that the polarization filter 31 having the left circulating polarization as the polarization filter $23_2$ is attached. Here, each of the polarization filters $23_1$, $23_2$ may be required to have the same polarization between the polarization filter $23_2$ and the polarization filter 31 and for example, the polarization filter $23_1$ may be a linear polarization of right 45 degrees; the polarization filter $23_2$ may be a linear polarization of left 45 degrees and the polarization filter 31 may be a linear polarization of left 45 degrees.

This screen 24 may merely keep the polarization axis of the projected light and then the screen may be formed by using a screen of a transmission type etc.; however, when the transmission type screen is used, the polarization direction of the transmitted light is kept as is such that the polarization filter 31 may have the same polarization direction with that of the polarization filter $23_1$ attached in front of the projector $22_1$.

Figure 2:
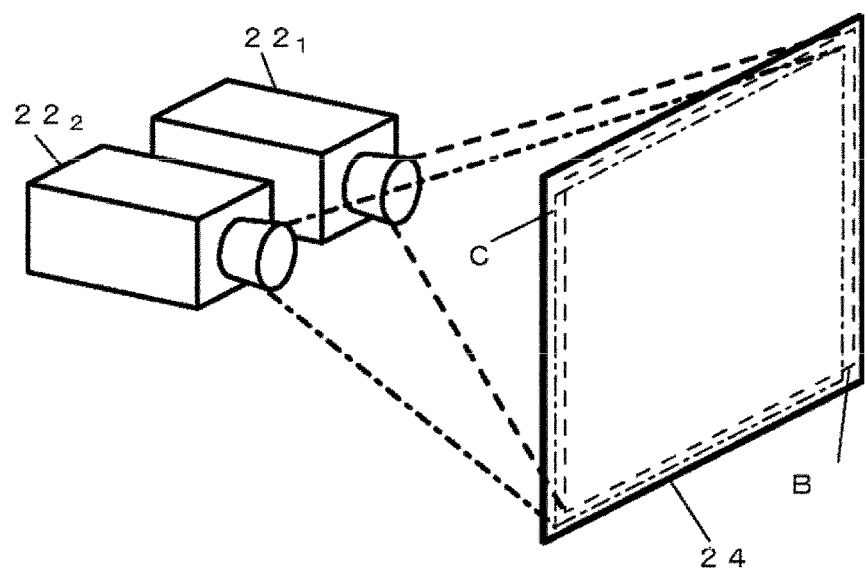
FIG. 2 A schematic perspective view of an assembled embodiment of a display part.

The screen 24 of the display part 24 is composed by the silver screen which reflects for example the projected light diffusely with keeping the polarization direction of the light and for example, as shown in FIG. 2 each of the projector $22_1$-$22_2$ projects on the screen 24 the main image (B') with modified luminance and the correction image generated from the sub-image (A') with modified luminance and the correction image (C) generated from the main image (B') while overlaying the projected images to put the display positions together.

(Summary of Function: Main Image and Sub-Image)

Figure 3:
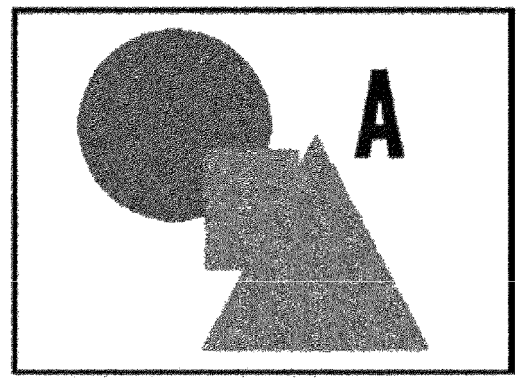
FIG. 3 An illustration of images provided to each of the display processing part.
Figure 3:
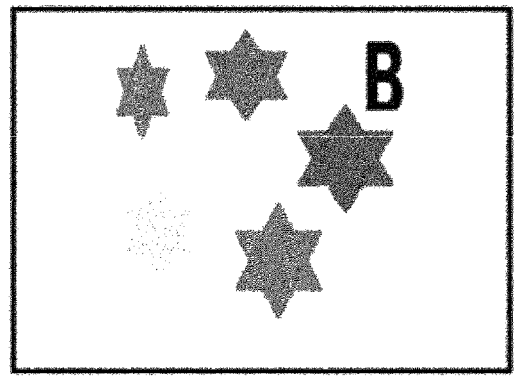

To the present information display system, the main image (B) showing to the particular observer shown in FIG. 3 and the sub-image showing to observers other than the particular observer depicted (A) in the same drawing are provided.

Figure 4:
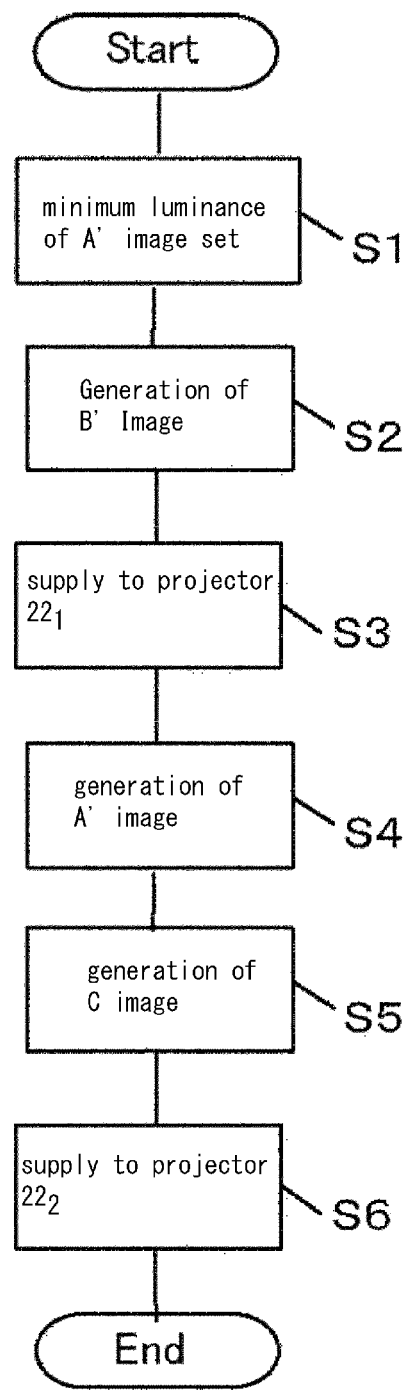
FIG. 4 An illustration of embodiments of images and synthesized images projected by each of projectors.

The generation of the images for each of projectors $22_1$-$22_2$ in the image processing part 10 may be executed by the processing shown in FIG. 4. When the above main image (B) and the sub-image (A) are supplied, first the luminance detection part 11 sets the minimum luminance value $a_{min}$ of the sub-image after modification of luminance (S1). This $a_{min}$ is a constant value to be added such that the values of the correction image (C) do not go negative and for example, if the sub-image (A) has 256 tones, the constant vale may be about 128. Here, this $a_{min}$ may be set depending on particular applications. For example, when one wishes to maintain the contrast of the sub-image, $a_{min}$ may be set to be low. Contradictory to this, when one wishes to maintain the contrast of the main image, $a_{min}$ may be set high.

Next, for example when the tone of the main image is 256, the luminance modification part $12_1$ generates the main image (B') by modifying the luminance of the main image (B) according to the following formula (S2) to supply it to the projector $22_1$ (S3).

$$b' = b \times \frac{a_{min}}{255} + U \qquad (1)$$

Here, b', b are the luminance values of each pixel of each of the main image (B') and the main image (B); U is the parameter for correcting the luminance levels caused by individual differences between the projector $22_1$ and the parameter is set beforehand depending on the luminance character of the projector $22_1$. As described above, when the value of $a_{min}$ is set to 128, the main image (B') has the condition with the one-half contrast of the main image (B). Here, the description is provided with assuming the luminance is the 256 tones, the same description may be applied to high range images such as HDR images. In addition, U is particularly the variable depending on each pixel of the main image (B) and for example, output of the projector $22_1$ projecting the main image (B) is lower than output of the projector $22_2$ projecting the sub-image (A), the variable may be set such that the luminance of the main image (B') is increased considering the lower output. When there are differences in the reflectance at positions on screen and the projector may not output a constant luminance over the screen, U may be set such that the values of each pixel become even. The value of U may be set such that the values b' become 0-255 for all of the pixels.

Figure 5:
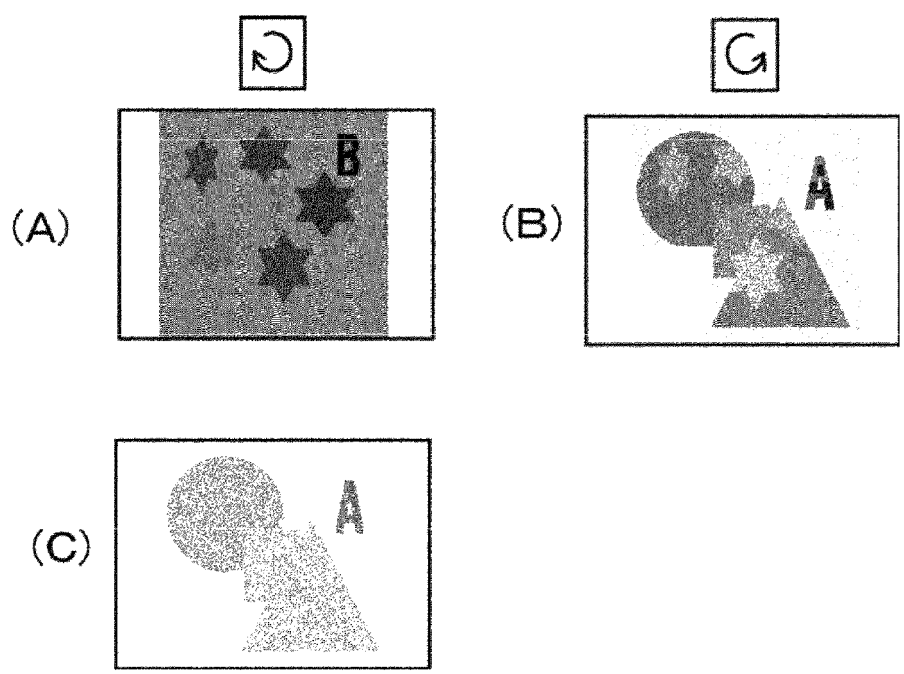
FIG. 5 A flowchart for an embodiment of information processing.

Thereby when the main image (B) has the condition shown in above described FIG. 3 (B), for example the main image (B') shown in FIG. 5 (A) is supplied to the projector $22_1$.

Next, the luminance modification part $12_2$ for example when the tone of the sub-image (A') is 256 tones, the sub-image (A') may be generated by modifying the luminance of the sub-image (A) using the following formula (S4).

$$a' = a \times \frac{255 - a_{min}}{255} + a_{min} + T \qquad (2)$$

Here, a' and a are the luminance values of each of each pixel of each of the sub-image (A') and the sub-image (A); T is the parameter for correcting the luminance levels caused by individual differences between the projector $22_2$ and the parameter is set beforehand depending on the luminance character of the projector $22_2$ etc. similar to the parameter U in the above formula (1). As described above, when the value of amin is set to 128, the sub-image (A') has the condition with the one-half contrast of the sub-image (A) while providing the bias of the one-half luminance of the maximum luminance.

The correction image generation part 13 generates the correction image (C) (S5) from the sub-image (A') and the main image (B') based on the following formula to supply it to the projector $22_2$ (S6).

$$c = (a'^\gamma - b'^\gamma)^{\frac{1}{\gamma}} \qquad (3)$$

Here, c is the luminance vales of each pixel of the correction image and γ is the γ value of the projector $22_2$. In the calculation of the luminance of each pixel, the γ value of the projector $22_2$ must be considered such that the luminance of the pixel of the correction image (C) is obtained. Here, generally γ=2.2 often used and hence, γ=2.2 is assumed in the formula (3) in the range that the gamma value of the projector $22_2$ may not largely deviate. In addition, the γ of the projector $22_2$ may be adjusted (calibrated) by using commercial adjustment software.

Thereby when the sub-image (A), the main image (B) have the condition shown in above described FIGS. 3 (A) and (B), for example the correction image (C) shown in FIG. 5 (A) is supplied to the projector $22_1$.

Each of the projectors $22_1$, $22_2$ projects each of supplied main image (B') and the correction image (C) to the screen 24. Thereby when the sub-image (A), the main image (B) has the condition shown in above described FIGS. 3 (A) and (B), for example the correction image shown in FIG. 5 (C) may be projected to the projector $22_1$.

(Advantage)

When such projected image is watched by naked eyes, for example the sub-image is seen by synthesizing the images projected by each of the projector $22_1$, $22_2$; however, when watched through the above eyeglass 30, only the main image (B') projected by the projector $22_1$ is seen as shown in the same figure (A). Then by passing the eyeglass 30 only to the observer being allowed to see the main image, such observer may see the main image and the other observers may see the sub-image.

Besides in the present information display system, as shown in the above formula (3), when the luminance of the pixels in the correction image (C), because the gamma value of the projector $22_2$ is considered, the correction image (C) may be displayed in an adequate luminance to hide the main image (B').

As described above, the present invention has been explained based on FIG. 1, the present invention, in short, in the observation system of the screen to which the main image and the sub-image are overlain, it makes possible for the observer observing whole light to be visually accepted the sub-image while it makes possible for the observer of the polarized light to be visually accepted to the main image. In order to achieve the object of the present invention, it becomes important that the observer observing whole light could not be visually accepted the main image and adequate contrasts for both images (main image and sub-image) should be kept.

In the present invention, to achieve the above object, predetermined processing is applied to the images to be projection objects to modify the tones of images. The tone of the image according to the present invention refers essentially the tone of the intensities of each color obtained on the screen onto which the images are projected and substantially refers the tone of the luminance of the image necessary for realizing the intensity. The tone in the luminance according to the present invention means essentially signal value ranges of the image projection system (image data, color space, image processing apparatus and projector) which projects the light.

Here, the tone value of the image luminance which is the object of the processing of the image processing part in the present information display apparatus means the tone values of the luminance and hence is different depending on the color space and the color expression system which is adopted by the data of the image. For example, the tone values in the RGB color expression system correspond to the RGB values and correspond to the exposure values of each color in the HDR format.

Considering the above points, the embodiment shown in FIG. 1 will be explained from the different view point based on FIG. 6. The main image tone value modification part $12_1$, the sub-image tone value modification part $12_2$, the offset setting part 11 in FIG. 6 each corresponds to the luminance modification part $12_1$, the luminance modification part $12_2$, and the luminance detection part 11. In addition, the same elements in FIG. 1 are referred by using the same signs in FIG. 6 and the explanations thereto are omitted.

Figure 6:
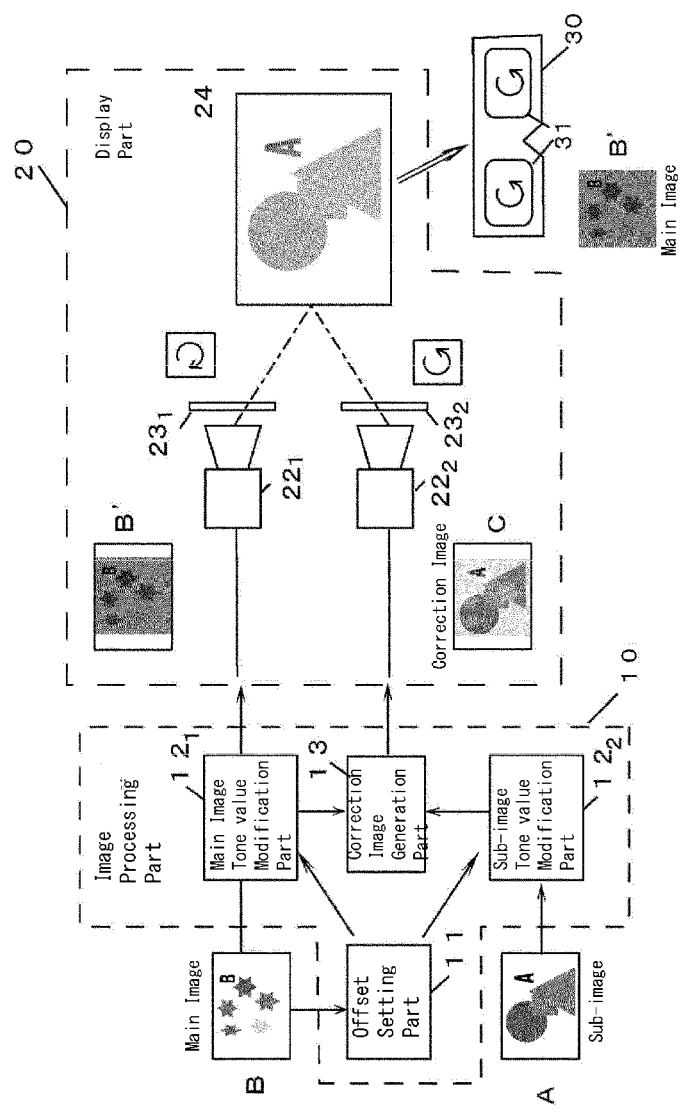
FIG. 6 A block diagram of an embodiment of the information display system according to the present invention.

FIG. 6 shows the information display system which uses two image projection system having equal performances to realize the luminance about the main image and the correction image. Here, these two image projection system are assumes to have the same dynamic range. When the main image (B) and the sub-image (A) are supplied to the information display system, the offset setting part 11 sets an adequate offset value depending on the main image (B).

On the other hand, the main image tone modification part 121 compresses the tone of the main image (B), that is to say, the tone values of each pixel are compressed so as to compress the tone. Now, the compress of the main image (B) tone is applied in the degrees such that the main image (B') keeps an adequate contrast. For example, when the main image (B) is a black and white image (tone: 0-256), the main image (B') after applied by the compression would be visually accepted even if the tone is reduced to the binary image (tone: 0-63) with one-quarter tone.

Now, the explanation of the offset value aforementioned will be continued. The offset value of the present invention means the value set so as to keep a predetermined range in the correction image (C) and this range is used to hide the main image (B') after the tone compression. In the case of the present embodiment, the offset value may be set to the adequate value being not lower than the maximum tone value, that is to say, the value not less than the maximum tone value of the main image (B').

Therefore, the magnitude of the offset value may be determined depending on the degree of the compression for the tone of the main image (B). Here, when considering general purpose property, the tone of the main image (B) may preferably be compressed to one-half of the dynamic range of the image projection system. When the dynamic range of the image projection system is assumed to be [0-255], the tone of the main image (B) may be compressed to [0-127] and the offset setting part 11 may set [127] as the offset value. In this way, the range for maintaining the minimum contrast may be kept for the main image (B) and the sub-image (A).

On the other hand, the sub-image tone modification part $12_2$ compresses the tone of the sub-image (A), that is to say, the tone values of each pixel are modified so as to compress the tone and the offset value set by the offset setting part 11 is added to the tone values of each pixel of the sub-image (A) after the compression. The compression of the tone of the sub-image (A) may be done such that the sub-image (A) after the compression should keep an adequate contrast and the maximum tone value of the correction image (C) obtained by adding the offset value to the sub-image after the compression should be within the dynamic range of the image projection system. With respect to this point, as described above, considering the general purpose property, the compression may be preferably done such that the tone of the sub-image (A) becomes about one-half of the dynamic range of the image projection system. When assuming that the dynamic range of the image projection system is [0-255], the tone of the sub-image (A) is compressed to [0-127] and then the offset value [127] is added to the tone values of each pixel to allocate the range [127-255] for displaying the sub-image (A).

The correction image generation part 13 generates the correction image (C) by subtracting the tone values of each pixel of the main image (B) after the tone compression from the tone values of each pixel of the sub-image modified by the sub-image tone value modification part 122. Then, the main image (B') after the tone compression may be projected by the projector $22_1$ to the screen 24 with the right circular polarization component. On the other hand, the correction image (C) may be projected by the projector $22_2$ to the screen 24 with the left circular polarization light.

As the result, for the observer put on the eyeglass attached with the polarization filter 31 of the left circular polarization the correction image (C) is cut and only the main image (B') projected with the right circular polarization light may transmit the eyeglass 30 to be visually accepted (direction of the projected light and the reflected right become reverse direction.). Here, the linear polarization filter may be used as described above instead of the right circular and/or left circular polarization filters and the present invention may be implemented by using other adequate means for cutting or decreasing light rather than the method using the above polarization (this is commonly applied to other embodiments described later.).

Hereinabove, the information display system using two image projection systems having the equal performance realizing luminance for the main image and the correction image and then the embodiment adopting two image projection systems having largely different performance for realizing luminance for the main image and the correction image will be explained.

Figure 7:
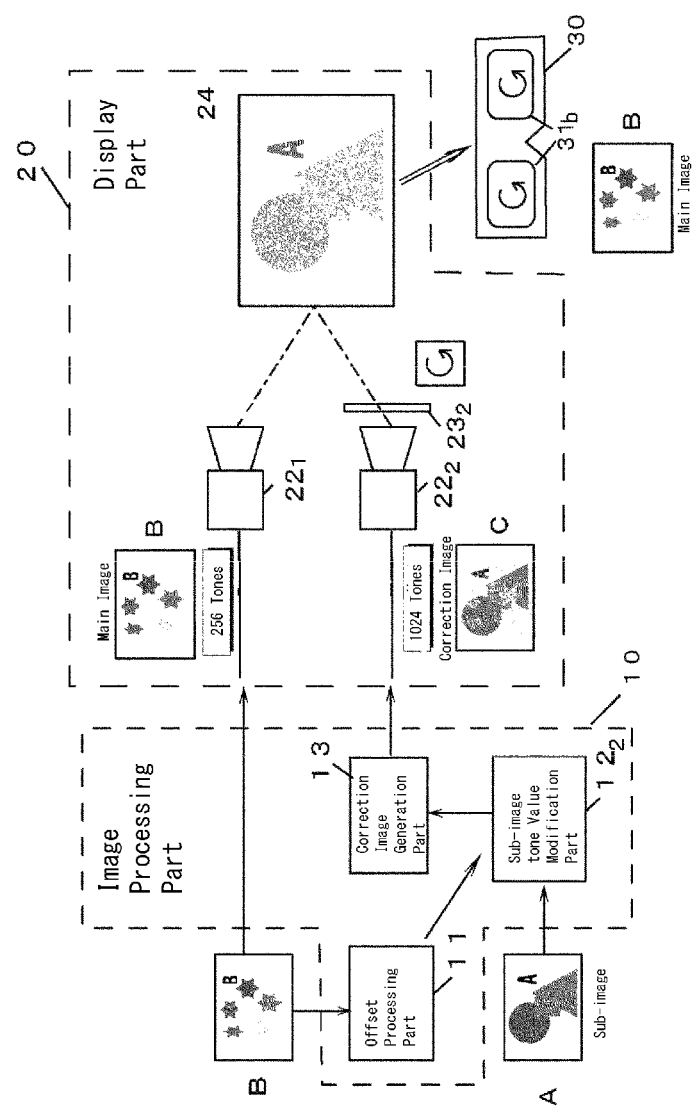
FIG. 7 A block diagram of an embodiment of the information display system according to the present invention.

FIG. 7 shows the information display system in which the performance of the image projection system for realizing luminance of the correction image (C) is sufficiently high comparing to the performance for realizing luminance of the image projection system for the main image (B). In the information display system shown in FIG. 7, it is assumed that the image projection system for the correction image (C) has the performance for realizing luminance four times larger than that of the image projection system for the main image (B) and the dynamic range of the image projection system for the main image (B) is [0-255] while the dynamic range of the image projection system for the correction image (C) is [0-1023], which is referred to high dynamic range (HDR).

When the performance for realizing luminance of the image projection system of the correction image (C) is sufficiently large comparing with the performance for realizing luminance of the image projection system for the main image (B), the tone of the main image (B) is not necessary to be compressed, and therefore, the main image tone value modification part 121 is not provided. The is no need for providing the polarization filter on the projector 221 for projecting the main image (B). That is to say, the main image (B) may be projected with keeping the original tone and with normal light on the screen 24.

On the other hand, the sub-image tone value modification part 122 makes shift the tone of the original image (A) by adding the offset value set by the offset setting part 11 to the tone values of each pixel of the sub-image (A). Here, according to the present embodiment, the polarization filter is not attached to the projector 221 for projecting the main image (B) and contradictory to this, the polarization filter 232 is attached to the projector 222 for projecting the correction image (C) such that an adequate offset value may be set considering the attenuation magnitude due to the polarization filter 232.

The correction image generation part 13 generates the correction image (C) by subtracting the tone values of each pixel of the original main image (B) from the tone values of each pixel of the sub-image (A) modified by the sub-image tone value modification part 122. Then, the correction image C is projected from the projector 222 to the screen 24 with the left circulating polarization light to overlay the projection image of the original main image (B). As the result, in the observer put on the eyeglass 30 equipped with the left circulating polarization filter 31 the correction image (C) projected with the left circulating polarization light may be blocked while only the main image (B) projected with the normal light may be visually accepted by passing through the eyeglass 30 (the projection light and the reflected light become reverse circulation.).

As described in FIG. 7, when the image projection system having the performance for realizing luminance being sufficiently high with comparing to that of the image projection system of the main image (B) may be prepared for the correction image (C), the present invention may be practiced without compressing the tone of each image. On the other hand, as the example shown in FIG. 7, even when sufficiently high luminance image projection system for the correction image (C) is not prepared, the similar system may be constructed by using many image projection system. Herein below, this construction will be described based on FIG. 8.

Figure 8:
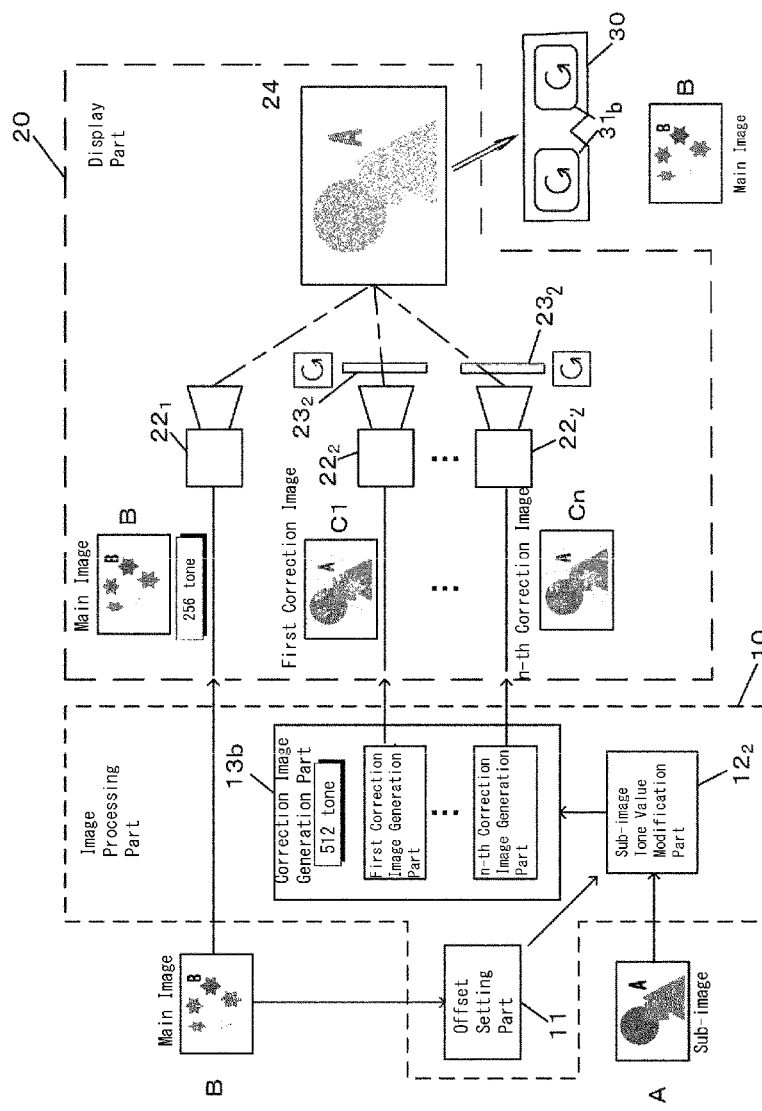
FIG. 8 A block diagram of an embodiment of the information display system according to the present invention.

In the information display system shown in FIG. 8, n image projection systems for the correction image (C) are prepared and it is assumed that the performance for realizing luminance of each image projection system are all even.

As the case of this embodiment same with the example shown in FIG. 7, the compression of tone of the main image (B) is not necessary and the projector $22_1$ for projecting the main image (B) is not necessary to provide with the polarization filter. That is to say, the main image (B) is projected with keeping the original tone to the screen 24 as normal light.

Here, according to the present embodiment, by an imaginary image projection system which may realize sufficiently high luminance compared with the that of the image projection system for the main image (B) providing n image projection system for the correction image. That is to say, n correction images (C1-Cn) from the n projectors are multiple projected and the sufficient luminance for hiding the main image on the screen 24 while realizing the necessary contrast for visual acceptance of the sub-image (A).

The sub-image tone value modification part 122 adds the offset value which the offset setting part 11 is set to the tone values of each pixel to shift the tone of the original sub-image (A). Here, an adequate offset value is set considering the attenuation magnitude by the polarization filter 2 similar to the embodiment of FIG. 7. As such, for example, the imaginary correction image having two times brighter than the main image (B) (sufficient luminance to hide the main image on the screen 24 and having two times higher dynamic range is defined.

On the other hand, the correction image generation part 13b according to the present embodiment comprises the first to the n-th correction image generation part corresponding to the n image projection system and each of the correction image generation part together execute mapping processing such that the imaginary correction image defined by the sub-image tone value modification part $12_2$.

The first correction image (C1)—the n-th correction image (Cn) are all projected to the screen 24 in the left circulating polarization from each of the n projectors 222 to overlay the projection image of the original main image (B). As the result, the correction image formed by overlaying n correction images projected with the left circulating polarization are blocked to the observer put on the eyeglass attached with the left circular polarization filter 31 and only the main image projected with the normal light may be visually accepted (projected light and the reflected light are reverse circulations.).

Now, the intensities of each color obtained on the screen to which the images are projected sometimes do not have entire correspondence to the luminance values of the images. Because the luminance values consisting the image data are theoretical ones; however, the intensities essentially requested in the present invention are the perceptive intensities including conditions of the screen and visual angles etc. Therefore, the case that the main image could not entirely hidden allowing visible access even though the projection has been made in the theoretical intensities which could entirely hide the main image.

With respect to this point, the information display apparatus above described may address to this problem by comprising a conversion table mating the luminance values of the image data to the intensities of each color obtained on the screen when the image data is projected to the actual screen. Particularly, a standard image (image data reflecting all tone values of luminance) is projected to the screen which is practically used by the image projection system practically used and the intensities of the projected image are measured for every tone values of luminance. That is to say, the intensities on the screen plane on which the light emitted from the pixels of each luminance is focused for all tone values of luminance are measured at the assumed visually acceptable angles. The luminance values obtained by the above procedure and the intensities are mated together to form "luminance-intensity conversion table". The "luminance-intensity conversion table" may be formed for each usage environment and is set in a predetermined storage region. Here, means for inter-conversion between the luminance and intensity of the image may not be limited to the conversion table and may be used adequate functions which may attain its purpose.

The image processing part of the information display apparatus above described is once supplied with the main image (B) and the sub-image (A) and converts luminance values of each pixel to the tone values using the "luminance-intensity conversion table". The main image tone value modification part $12_1$ and sub-image tone value modification part $12_2$ executes a set of calculations to such converted the tone values of intensities as the calculation objects and again converts the calculation results (tone values of intensity) to the luminance values using the "luminance-intensity conversion table". The display part projects the image data consisted of reconverted luminance values. Using the above described sequence the advantage of the present invention may be securely obtained in spite of any conditions of the screen, conditions of the optical system of the projector and projection environments etc.

Now, in the above explanation, the image of an still image is explained as for example, the main image (B) and sub-image (A) are supplied as a movie image, the present invention may be used to display movie images. In addition, when a credit title of a particular language is used as the above main image and an image is used as the sub-image, it may be possible to shown synchronously multi language credit titles by presenting a particular person putting on the eyeglass 30. Furthermore, when the image of games instead of the main image and the sub-image are used, it becomes easier to develop game contents using multiplicity.

(Example of Usage)

The system according to each of the above examples may be applied to the following applications. (A) when the main image (B') is set to security information may be used as the image, for example, for particular persons such as shop staffs or persons at a sponsor side etc. and the sub-image (A') may be set to the image which includes whole even image with no information or the image presented to general guest such as a digital signage and a particular person sees the displayed image through the polarized eyeglass or a contact lens applied with polarization, the security related information which would not be seen the general guests such as, for example, where a VIP or a person for paying special attention is present and the like may be communicated.

(B) Movie Theater etc.: The main image (B') may be the image with the credit title such as movies in a movie theater or an event place and the bus-image may be the image without the credit title. The observer unnecessary with the credit title with putting on the eyeglass and the observer necessary with the credit title without the eyeglass see the same screen thereby the credit title may be shown to only the observer which requires the credit title.

(C) Museum etc.: The main image (B') may be the image of a bone framework of dinosaurs in a museum ant a theme park etc. and the sub-image (A') may be an outlook such as skins on the surface, thereby the observer without the eyeglass may see the outlook and the observer with the eyeglass may see the bone framework. Alternatively, the main image and sub-image are reverted and the observer with the eyeglass may see the outlook and the observer without the eyeglass may see the bone framework.

(D) Scholl: The main image (B') may be questions and model answers thereof and the sub-image may be only the questions. The screen may be placed near a black board at the front of a teaching room. Students solve the questions by themselves by watching the sub-image without the eyeglass and then check their solutions with putting on the eyeglass.

(E) Contents charge Technology: free contents are projected as the naked eye image and different charges may be possible in the same projection contents and time when the eyeglass with the filter is charged. It may be effective when credit titles or the contents are replaced seamlessly depending on children or adults.

(F) Medical information display for X-ray and privacy information: When a doctor explains in detail and in easy to understand to a patient and/or its family, it may be realized a medical information display that a real image such as cloths or bodies may be presented which are easy to understand and the medical information such as CTs and X-rays through the filter. Alternatively, in the medical display environment in a surgery operation, multiplied information may be displayed in the limited space without considering getting wet or getting stain.

(G) Application for individual specific digital signage: The eyeglass with the filter may be passed to a particular character beforehand. In the digital signage in public space such as a station or a train, the information presentation may be possible without disturbing the information display for public purposes. For example, foreign language display to foreign persons, messages associating to mobile phones, information for members, display of passwords or individual information, filtering display in combination with a network type device and location information, or information display with individual specified using its preference information obtained beforehand may be realized. As one example of practicing, a QR code may be displayed to the image which may be seen by a person putting on the filter and prepared information in the hidden URL could be accessed with personal authorization if the QR code is photographed through the filter by the GPS implemented mobile phone of a user.

(H) Image teaching materials such as an electronic black board or language learning etc.: In an environment in which the attendants such as foreign persons or leaning handy capped children requiring support under the learning are mixed among general attendants, displaying large amount of information on the electronic black board or the screen should make stresses to both attendants. According to the present invention, only relatively basic information such as for example, "formula" and "questions" may be presented in the naked eyes and more additional information such as "explanation" or "answers" may be presented in putting on the filter, thereby making progress depending on understandings of each attendant as well as advantageously making it easy to recognize for teachers understanding levels of learning attendants.

(I) Application to a display system of entertainment contents such as games characterizing concealment: In the interactive contents such as television games, flexibility for contents production may be provided by putting difference at the same place both in time and space between the player putting on the eyeglass and observer in the naked eyes.

Example I-1

Handling the eyeglass with the filter as an important item in the game: by the eyeglass provided with the filter which is attached to the game product or is separately sold, the different evolution from the stories or actions without the eyeglass may be displayed.

Example I-2

Enhancement of usability in simultaneous playing by many players: Conventionally, racing games, battle games, shooting games or puzzle games are played in divided screen among many players simultaneous playing. Two channel simultaneous display may be attained between the player putting on the eyeglass and observer in the naked eyes.

Example I-3

Display of auxiliary information such as commentaries: In the games such as types of Shogi and Igo, the information such as where a piece may be placed or which is more advantageous may be necessary. These information may be optionally changed by players by putting on the eyeglass or naked eyes. In addition, it may provide a high additional value to distribute the eyeglass with associating to publication materials such as a strategy book. It may be possible to use direction screen in a pachinko play and it may be used when announcements which are not directly relates to the game and the display of shop services such as "today's win numbers" are additionally displayed.

Example I-4

Simultaneous run of game and original PC software:

For example, in the communication to the player behind the network, when conversations through letters browser software may be run at simultaneously, conventionally two screens are necessary. Because it is hard to displace the view point in games with rapid movements, chats may be performed by keeping gaze to the play screen.

Game which does not makes aware playing the game to a person without the eyeglass: For example, for the purpose that the game contents should not be displayed other than the players, images associating with keyboard or mouse are displayed as the images for the naked eyes.

Example I-5

Display of contents adapting to ratings of many players: For example, when games are played in a house, the present rating system has no means for stopping to play the game for high school students among brothers of which one is a primary school student and another is a high school student. By setting ages for naked eyes and for putting on the eyeglass beforehand, a plurality of players may enjoy safely the contents simultaneously without knowing the contents of the game.

Example I-7

Variations by making aware putting on the eyeglass to the system side: In the examples E-1-E-6, using the sensing technology such as computer vision etc., the dynamic contents are play backed by sensing whether or not the user currently puts on the eyeglass or not.

(J) Functioning multiple screens by the image source of 1 system and addition of optical system: For example, by using the reflectance optical system shown in FIG. 9, one system image source (image that the main image and the sub-image are arranged in left and right) projected by one projector may construct the multiple screen. Or as shown in FIG. 10, the system may be implemented by the polarization beam splitter, thereby similar display to the above by one projector may be provided so as to lower the system total costs.

Figure 9:
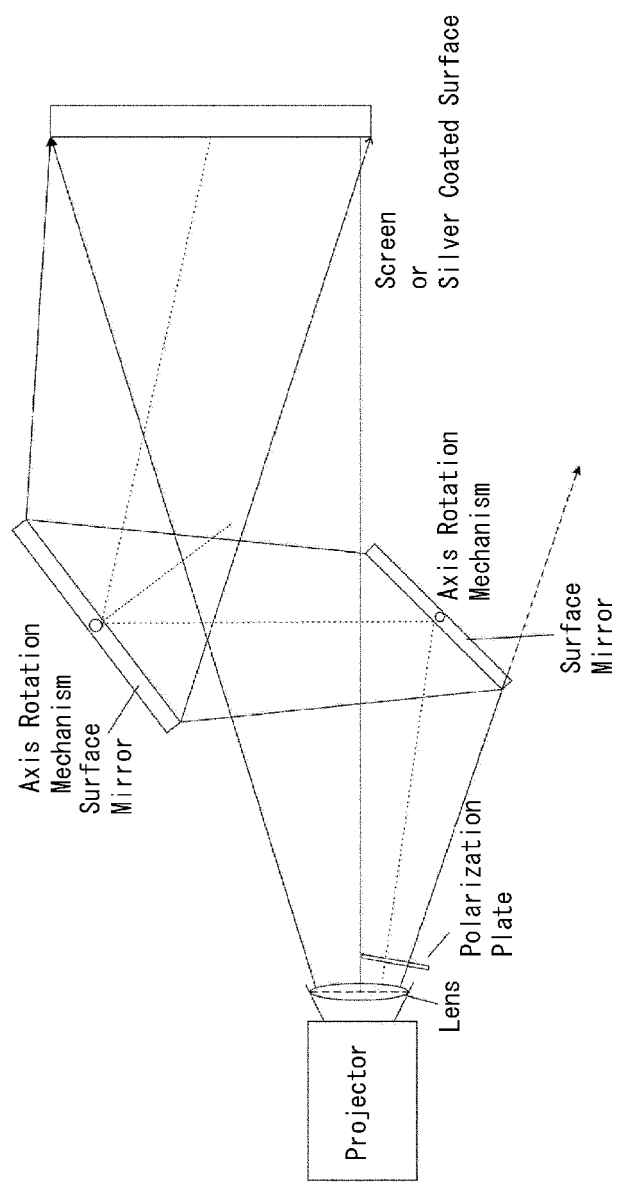
FIG. 9 A diagram of a modified embodiment of an optical system in a display part assembled to the information display system.
Figure 10:
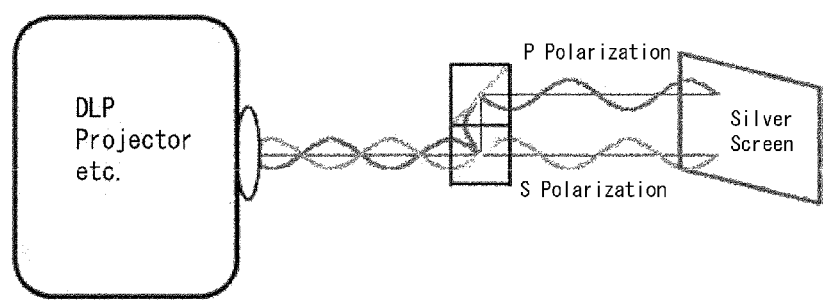
FIG. 10 A diagram of a modified embodiment of an optical system in a display part assembled to the information display system.

Here, in this FIG. 9, because there is the "side-by-side" which places two image contents in left and right as a general 3D image format, the screen is divided into right and left manner; however, it may be possible to use the right and left images by dividing the upper and lower regions of the image projected. The image quality enhancement technology using the above formula (3) for the gamma value, the attenuation by the filter may be absorbed. Furthermore, an Affine conversion, a trapezoid correction may be applied to absorb the intensity differences of the optical paths and the projectors.

(K) 3D image for avoiding turning multiple in the visual watching by the naked eyes: as shown in above Example 2, the parallax multiple images may not be seen, that is to say, 3D image which allows to see 2D image for one side eye in high quality. The above (J) is applied to implement such 3D projection system by one projector. In this embodiment, the eyeglass in the observer side is for one-eye use; however, in order to keep the luminance at the same level easily, the polarization filter may be placed at one eye side and the attenuation filter may be placed at the other eye side so as to provide flexibility in a design of the eyeglass and image quality.

(L) Prevention of peeping for ATM or PC liquid crystal screen etc.: by applying the present algorism to liquid crystal monitors described in JPH10-10521 or JP2008-26581 which focus to the control of polarization conditions rather than the projection optical system, the peeping block monitor may be realized in which the image being not seen by the naked eyes may be observed only by the users putting on the filter. The usual peeping block filter may be provided as stamps on the filter or black patterns; however, according to the present invention, any information such as a screen saver or notice images may be presented to the peeping observer.

(M) Application for infra red optical system: The present invention may be applied to not only visible images but also to images expressed by infra red radiation which is usually not visible by human eyes. For example in the above (A) and (C), additional information may be displayed by overlaying the infra red images or signals. For example, special codes which are not seen by human eyes but drawn in the infra red light are presented to the naked eyes and the image is photographed by a camera; then a theater or a seat position of the steal shots may be determined. Alternatively, the usage that to the image photographed by the filtered optical system a key to permit visual access to the contents may be buried. By adding a polarization filter to a camera on the mobile phone, many information channels such as [visible, infra red, hidden, naked] may be provided with one screen.

Example 2

The information display apparatus of the first embodiment may be modified such that right eye images and left eye images are input to the image processing part 10 and the eyeglass 30 is modified to use in the 3D display. Particularly, for example shown in FIG. 11, for example the right eye image shown in FIG. 12 (B) instead of the above main image (B) may be supplied to the luminance modification part 121 and the left eye image shown in FIG. 11 (A) may be supplied to the luminance modification part 122.

Figure 13:
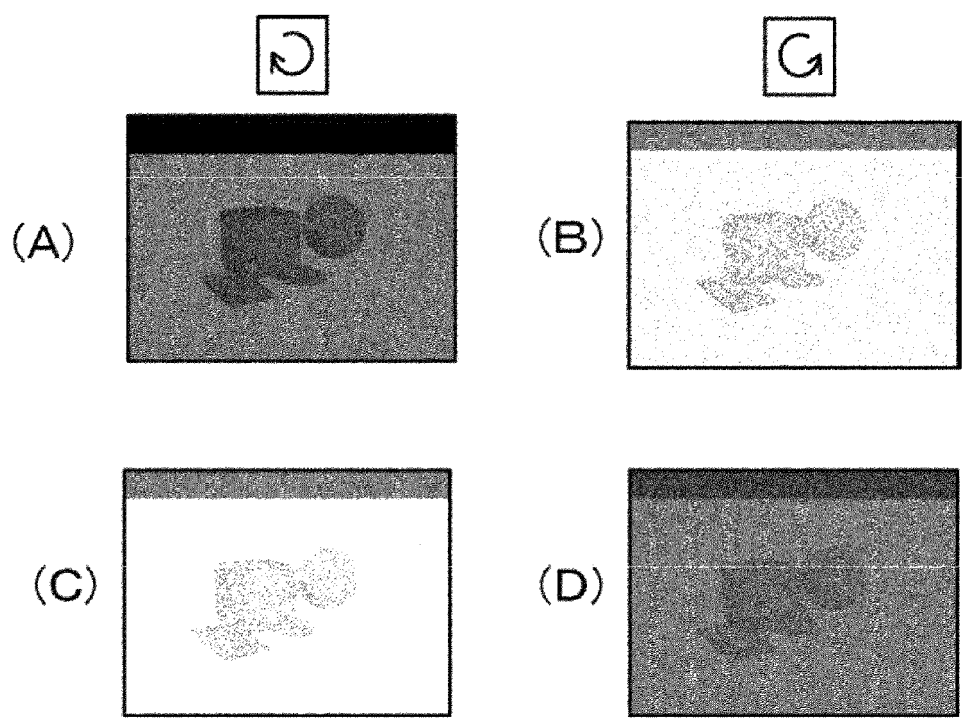
FIG. 13 A drawing of embodiments of images projected by each of the projectors and the synthesized image.

When such input images are input, in the function as above described, the image shown for example in FIG. 13 (A) (the right eye image with modified luminance) may be projected to the screen 24 from the projector $22_1$ and the image for example shown in FIG. 13 (B) (corrected image) may be projected to the screen 24. As the result, the image projected on the screen 24 is as shown in FIG. 13 (C) and when the image is seen by the naked eye, the plane image (right eye image with modified luminance).

Figure 11:
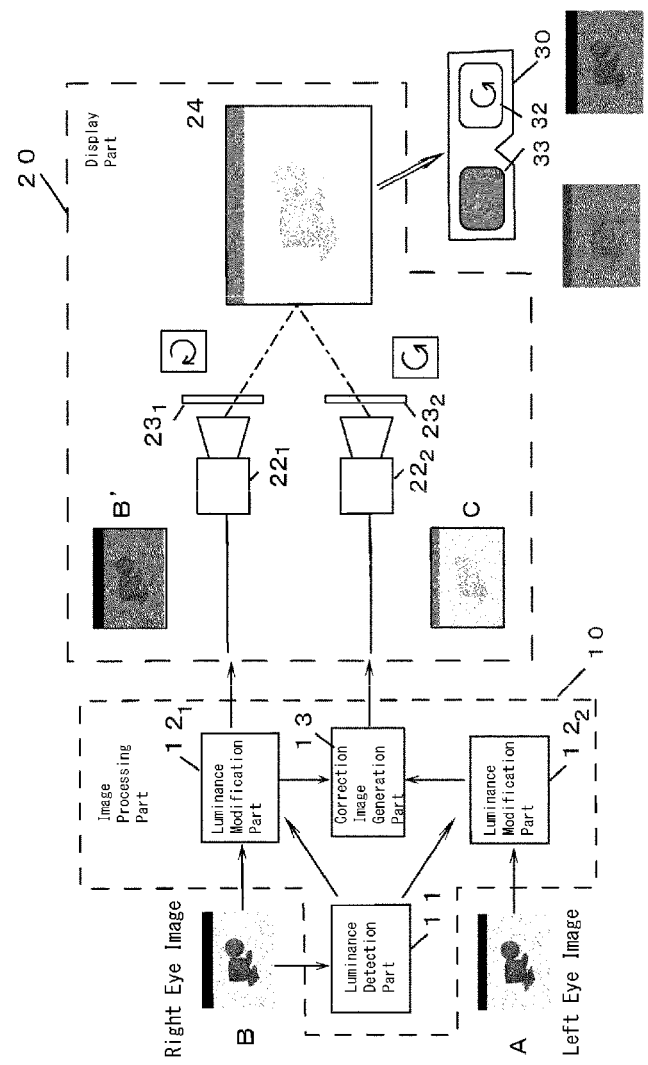
FIG. 11 A block diagram of an assembled embodiment of the information display system of Example 2 according to the present invention.
Figure 12:
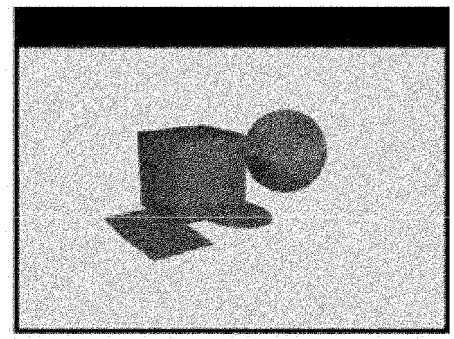
FIG. 12 A drawing of embodiments of the images supplied to each of the display processing part.
Figure 12:
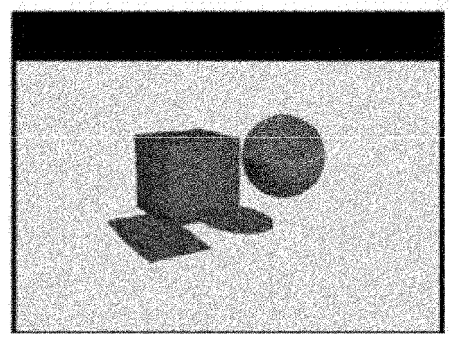

If such images are seen as the 3D image, as shown in FIG. 11, the eyeglass 30 with the polarization filter 32 having the same polarization direction with the polarization filter 232 on the right eye part and with the attenuation filter 33 on the left eye part may be used. The attenuation filter 33 decreases the intensity of the incident light to the level that the image projected to the screen 24 (the luminance level of the left eye image shown in FIG. 11(c)) and the luminance level of the right eye image of FIG. 13 (A) may become to be about same (decreases to be about one-half).

When the screen 24 is seen through such constructed eyeglass 30, the right eye sees only the polarization component which is the same direction of the polarization filter 221 (the projected light from the projector $22_1$ with the left circulating polarization right reflected by the screen 24), that is to say, the image shown in FIG. 13 (A) (the right eye image modified with the luminance); the left eye sees the plane image with the attenuated luminance level (left eye image) shown in FIG. 13 (D). Then though the lowering of the contrast, 3D image may be visually recognized.

As described above, the information display system may easily address to 3D display by changing the images supplied to the image processing part 10 and the eyeglass 30. In addition, the present information display system may provide only the left eye image to make visually accept the plane image when the screen 24 is seen by the naked eyes during the condition for 3D display.

Example 3

Modification Example

In the above example 1, the construction that the main image with modified luminance and the correction image are projected to the screen 24; however, other system may be used as far as the display means allows to see by separating each image with the polarization filter instead of the projector 221, 222.

Figure 14:
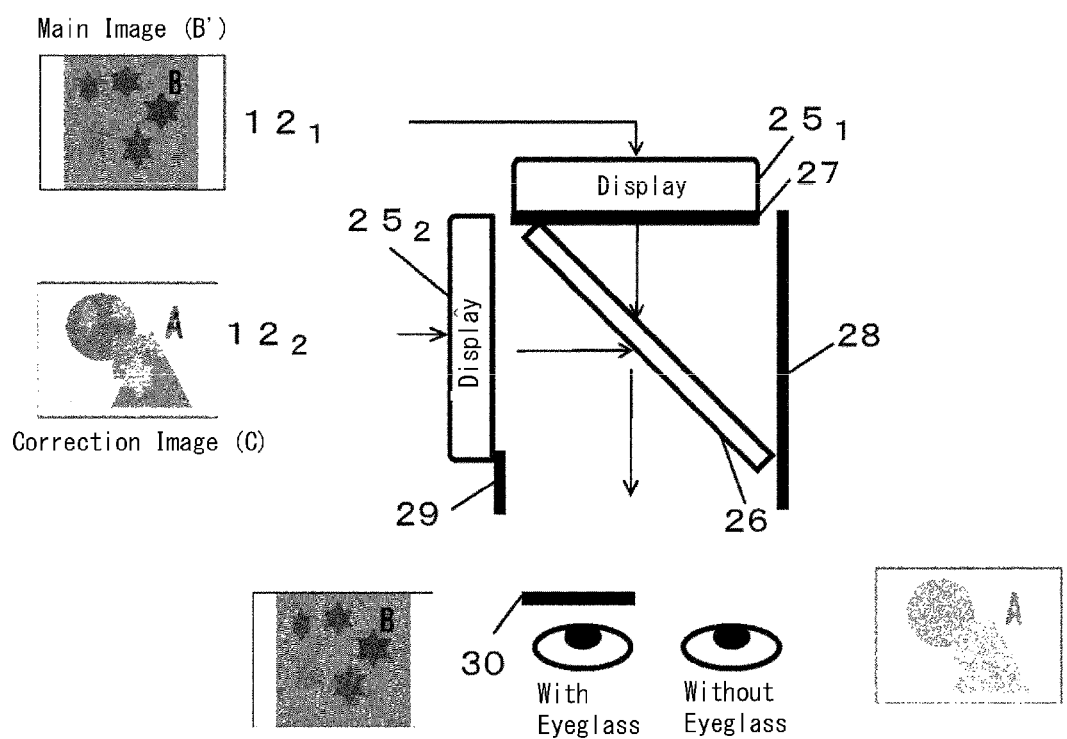
FIG. 14 A drawing of an assembled embodiment of the information display apparatus of Example 3 composed using a liquid crystal display.
Figure 15:
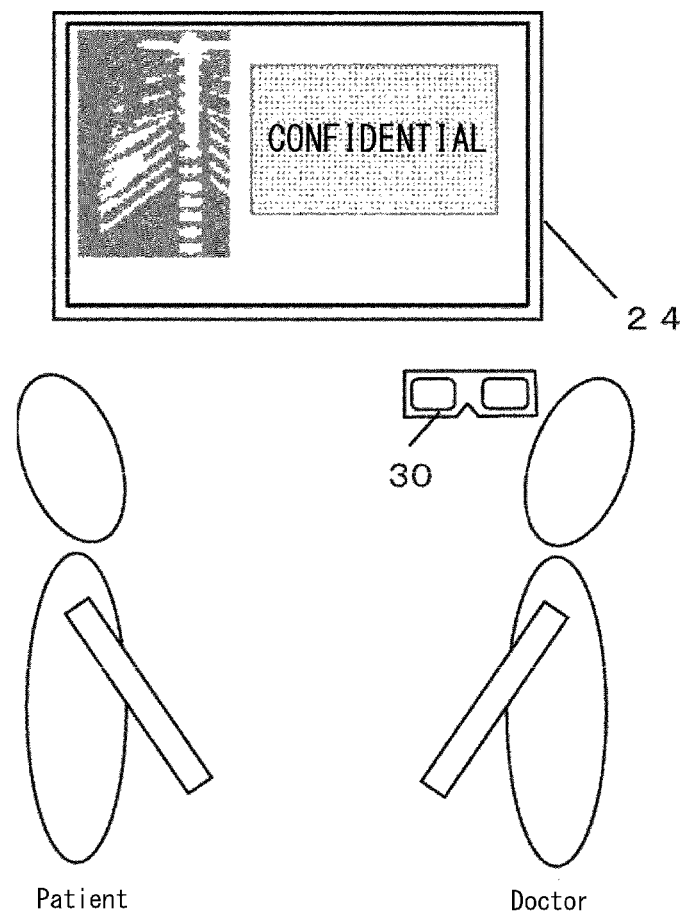
FIG. 15 A schematic diagram of the information display system according to Example 4 in its practical usage.

FIG. 14 shows the construction example in which the images of two liquid crystal displays (display 251, display 252) are synthesized by the optical system using the half mirror 26 as described in JP 2007-260155 (FIG. 7, FIG. 2, and corresponding descriptions thereof) instead of the projectors $22_1, 22_2$ in the information display apparatus having the construction of Example 1 shown in FIG. 1. In front of the display 251, the polarization plate 27 is disposed. In the nominal liquid crystal display, the polarization is already used in the device so that the display 251 may preferably be selected from display system without using the polarization such as an organic EL display. In addition, the light shield plate 28,29 are disposed so as to keep sufficient distance to the view point in the construction example.

By projecting the main image (B') with the modified luminance using the above constructed information display system and the correction image (C), the observer with the naked eyes may see the sub-image and the observer with the eyeglass 30 may see only the image from the display 251 (main image B').

Example 4

(Application: Example for Medical Field)

Figure 16:
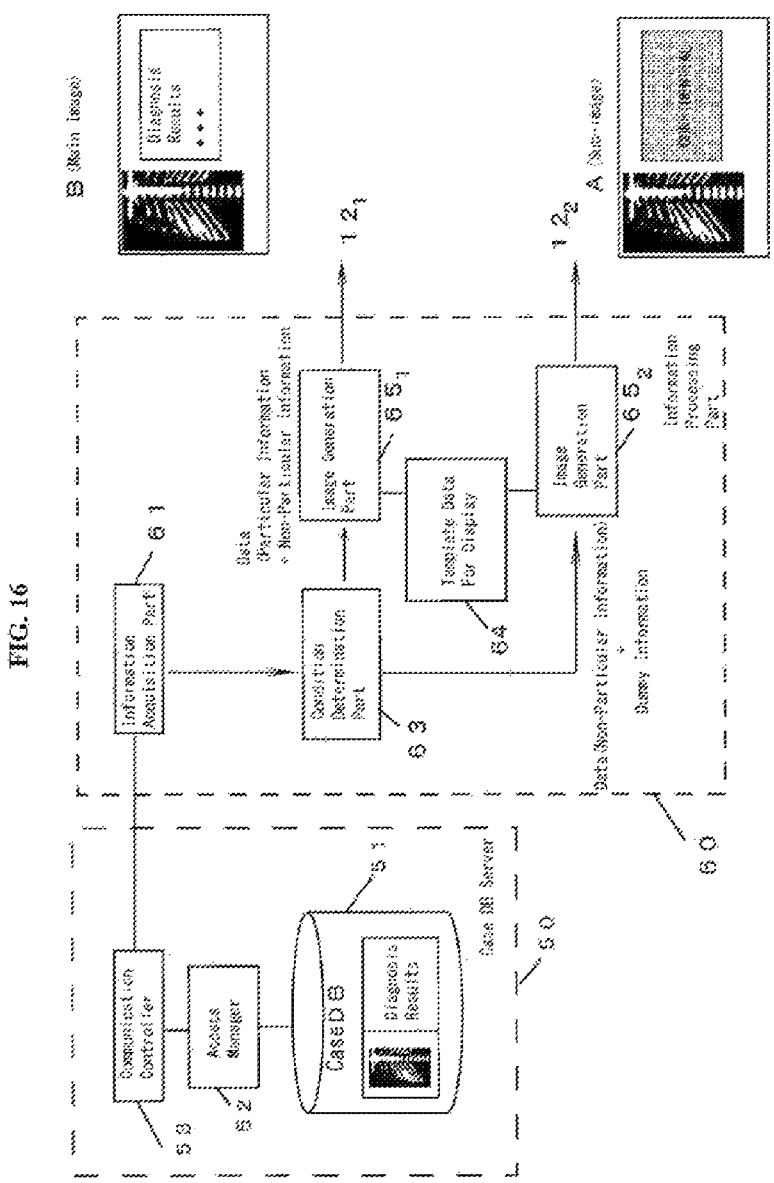
FIG. 16 A block diagram of an assembled example of a principal part of the information display system.

The information display system described above may be used as the information display system for displaying medical information between a doctor and a patient. In the information system, the case DB server 50 for example shown in FIG. 16 and the information processing part 60 for generating the main image and the sub-image supplied to the image processing part 10 are equipped as well as the image processing part 10 as likely to the above FIG. 1 and the display part 20, and the eyeglass 30.

Figure 17:
FIG. 17 A drawing showing examples of data.

The information provided by the case DB server 50 is stored as the records shown for example in FIG. 17 foe every case and each of the records includes X-ray image, data for treatment etc. and flags which indicate the data are particular information or not, and dummy information etc. used when the data are the particular information.

The information acquisition part 61 of the information processing part 60 acquires the treatment information (record) from the case DB server 50 depending on operations of the particular observer such as for example doctors. The condition determination part 63 supplies all of the data in the records obtained by the information acquisition part 61 (non-particular information and particular information) to the image generation part $65_1$; however, the non-particular image other than the particular information and the dummy information corresponding to the particular information to the image generation part $65_2$. In the template data 64 for display the data items and display positions etc. in the records to be displayed are defined for each of the main image and sub-image. The image generation part $65_1$ generates the main image (B) depending on the supplied information and then supplies them to the luminance modification part $12_1$. In addition, the image generation part $65_2$ generates the sub-image (A) depending on the supplied information and provides them to the luminance modification part $12_2$.

Figure 18:
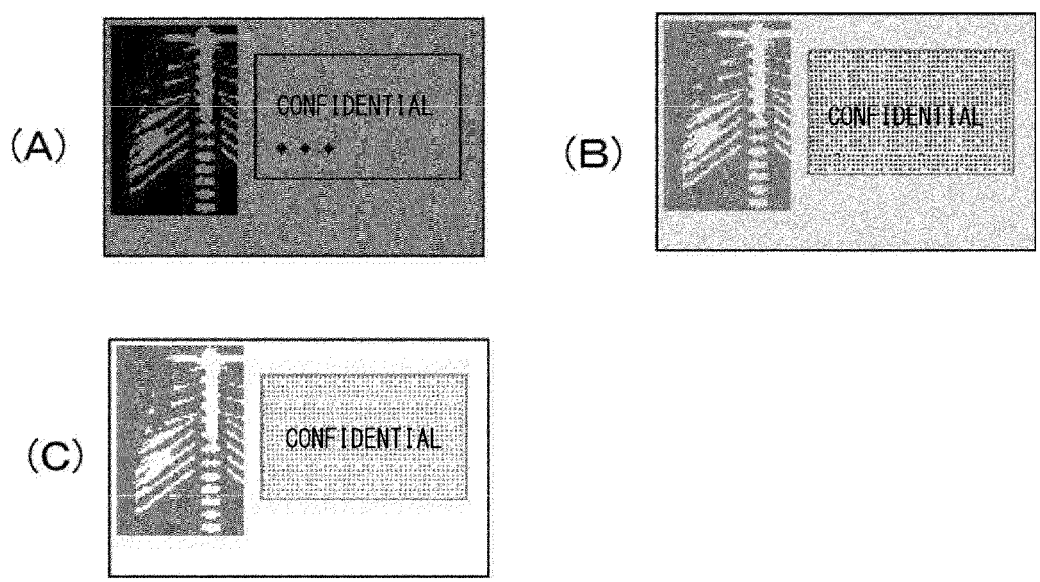
FIG. 18 A drawing of examples of the image projected by each of the projector and the synthesized image.

When the above described main image (B) and the sub-image (A) are supplied, the image processing part 10 generates the main image (B') with the modified luminance and the correction image (C) to make project to the screen 24 through each of the polarization filter $23_1$, $23_2$ by the projector $22_1, 22_2$. When the main image (B) and the sub-image (A) are in the condition shown in above FIG. 16, the main image (B') with modified luminance and the correction image (C) become as FIGS. 18 (A) and (B). Furthermore, the image displayed to the screen 24 by the projection of these images is the sub-image as shown in FIG. 18 (C) when being seen by the naked eyes. Contradictory to this, only the image (the main image (B') with modified luminance) projected from the projector $22_1$ may be seen when seen through the eyeglass 30. Therefore, likely to the above example 1, only the doctor may see the main image and the patient may see the sub-image by making put on the eyeglass 30 to the observer allowing access to the main image such as the doctor.

Thereby, for example, the usage, that the particular information such as individual information etc. in the case which is desirable to show only to the particular observer, in this embodiment the doctor, is hidden to the other observer, in this embodiment the patient while showing the non-particular information in the case to explain the case, may be possible.

Example 5

(Application: Multiple Image Diagnosis)

The above described information display system may be used to display diagnosis images in for example medical fields. This example corresponds to the case that many images may be required and referenced by displaying in alternatively.

Figure 19:
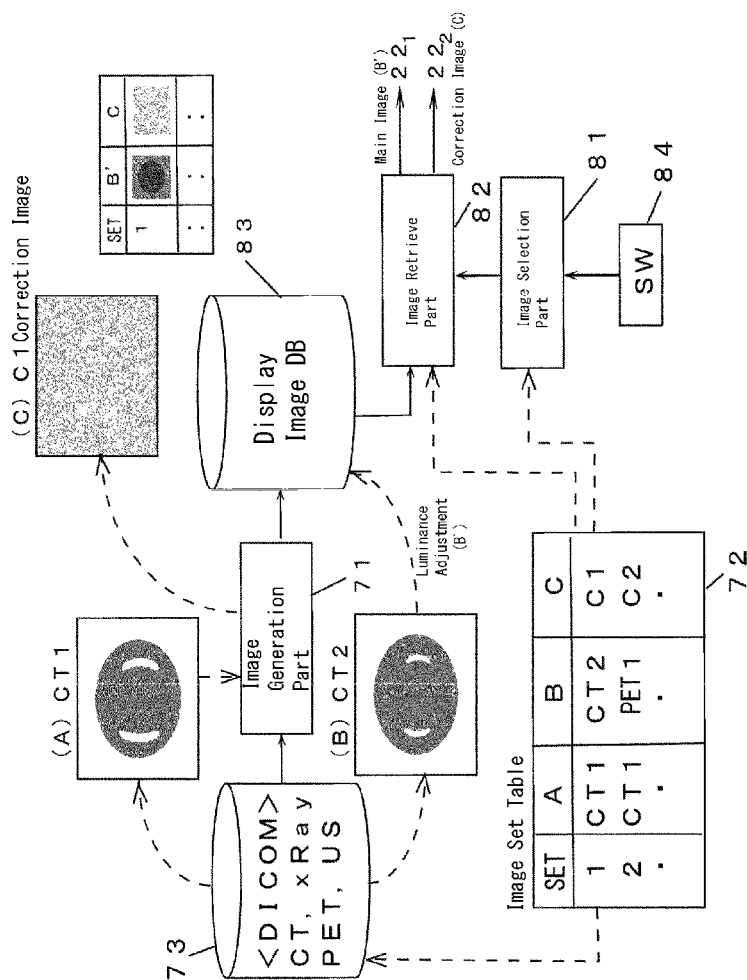
FIG. 19 A block diagram of assembled embodiment of the information display system of Example 5 of the present invention.

In this example, the image displayed at once on the one display apparatus is two images which are one main image and one sub-image. However, in an operation room etc., there may be the case that requirements that a plurality of images such as for example X-ray images, CT images, PET images and supersonic diagnosis image should be referenced. In addition, the CT image and the PET image displays a human body as round slices such that a plurality of pieces may be present every one patient and it may deemed that a set of the images which the operating doctor want to see are changed. This example for addressing such requirement and FIG. 19 shows the main part construction used for such a field. The main image (with modified luminance) and the correction image are supplied to the projector $22_1, 22_2$ shown in the above FIG. 1 from the image retrieving part 82 to display them.

This information display system comprises the image generation part 71 for generating the images for display beforehand, the image set table 72 for managing the set of images which are expected to see at the same time (image set: main image and sub-image), and image database 73 for providing medical digital image such as DICOM (Digital Imaging and Communications in Medicine) etc. format, the image selection part 81 for selecting the image set to be displayed depending on operations from a user interface such as the foot switch 84 or eye controlled input etc., and the image retrieving part 82 for retrieving the display image (main image and correction image) from the display image DB 83 and for supply them to the projector $22_1, 22_2$.

(Function: Generation of Image for Display)

Figure 20:
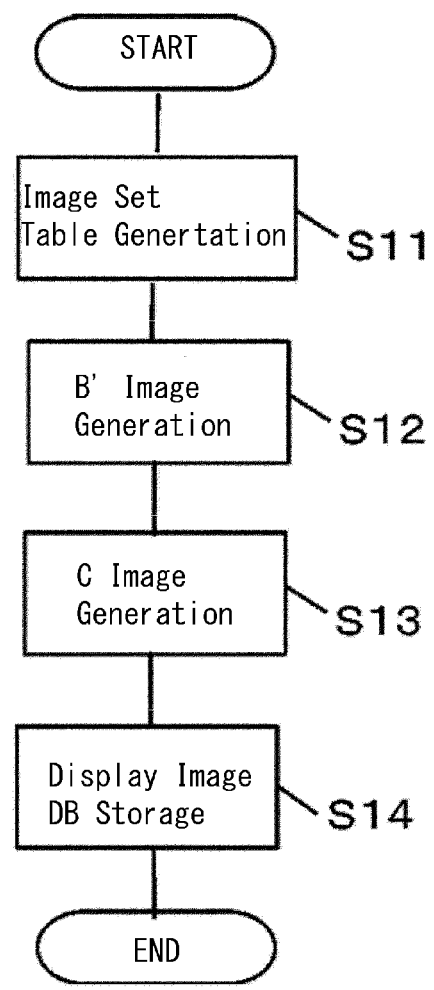
FIG. 20 A flowchart of an embodiment of the image processing.

In the present image display system, according to the processing shown in FIG. 20 beforehand, required image sets are selected from the database 73 such as a DICOM system and then generates the table 72 indicating the combination of the sub-image (A) corresponding to ID (SET), the main image (B) and the correction image (D) and further then stores it (S11). The image generation part 71 retrieves the images stored in the database 73 according to the image set table 72. Then, the image generation part 71 performs position mating per pixel per pixel required to multiple display and the main image (B') with corrected luminance and the correction image (C) (S12, S13) to store them to the display image DB 83 (S14).

As such in this example, the main image (B') with corrected luminance and the corrected image (C) beforehand are generated in the image generation part 71 and are stored in the display database together with auxiliary information such as ID (SET) of the image set. Here, the display image DB 83 is not limited to database and may be a file or a memory region.

(Function: Display of Image)

Figure 21:
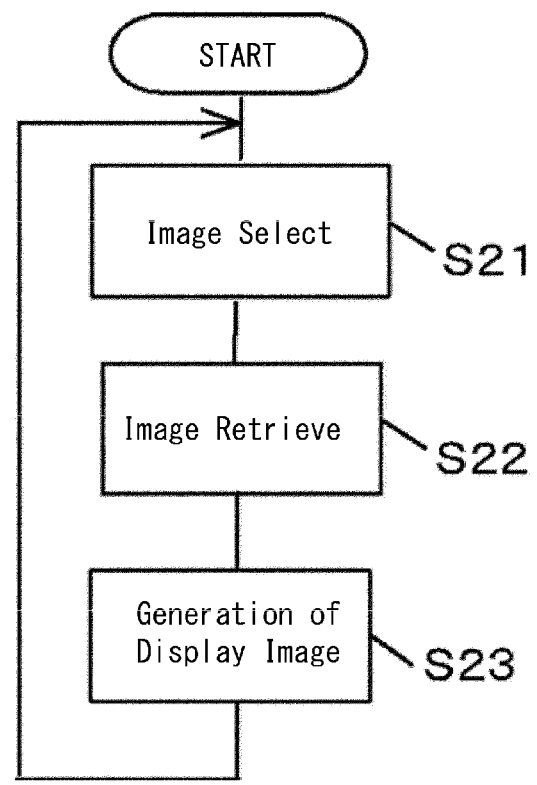
FIG. 21 A flowchart of an embodiment of the display processing.

When the images stored in the display image DB 83 are displayed, each of the correction image and the main image (with modified luminance) is supplied to the projector $22_1$, $22_2$. Particularly, as shown in FIG. 21 when the foot switch 84 is operated the image selection part 81 selects the image set to be displayed. Then the main image (B') and the correction image (C) corresponding to ID (SET) of the selected image set are retrieved from the display image DB 83 to supply each of the projector $22_1, 22_2$.

Thereby for example a certain stage in the operation, when the image set of ID "1" is selected, the image retrieval part 82 retrieves the main image (B') and the correction image (C) from the display image DB 83 and supplies them to each of the projectors $22_1, 22_2$. Thereby the main image (B') and the correction image (C) are synthesized on the screen 24 to recognized to the naked eye observer as the sub-image. When the same image is seen through the eyeglass 30, the image may be recognized as the main image.

For example, when the main image is an X-ray image and the sub-image is an MRI image and these images and are then multiplied, different image diagnosis, i.e. bone structures and condition of blood tube or muscles are visually recognized instantly depending on the presence of the eyeglass 30. At medical scenes, when practiced on a light box in an internal examination room and/or treatment room or a wall in the operation room, a plurality of medical images may be rapidly visually recognized even in the environment suffering restrictions to setting place, volume, wet, stain.

(Advantage)

According to the present information display system, when digital medical image data such as PET, CT, X-ray, outlook are each multiplied, the visual recognition ability may be enhanced while keeping the screen region to be compact. Particularly, the system may be used in the environments with the restriction for the setting place, with the restriction for use of both hands and/or the environment durable for wet or stain.

Besides, the main image and the sub-image are not limited to the medical image data and text information may be handled in same manner when the text information is transformed to an image. A plurality of information layers such as necessary information such as measured values by the image diagnosis apparatus and instructions read from a clinical chart etc. may be obtained without time cost relating to switching and without using both hands in the restricted space.

Modification Example

Here, during the operation the operation doctor puts on the polarization eyeglass only a part of light is allowed to pass such that it may be the case that positions near hands becomes had to see. Among normal far and near eyeglass, there is an eyeglass that each of right and left lenses are divided into upper and lower two segments and the upper half is used for looking far and the lower half is used for looking near. When this idea is applied to the present invention, this problem will be overcome.

Particularly, when using the eyeglass 30 with which only the upper halves are provided with the polarization plate in left and right and the lower halves are kept transparent, clear and bright image may be obtained when the doctor looks to the patient below; when the screen 24 is seen at upturned eyes, the main image may be seen through the polarization plate; when the screen 24 is seen at downturned eyes, the sub-image may be seen through the transparent plate. In this way, the main image and the sub-image may be seen without putting off the eyeglass during the operation.

Alternatively, the eyeglass 30 may be constructed as optical parts constructed only by the filter such as a loupe or a mask.

Example 6

(Application: Block of Privacy Information)

Figure 22:
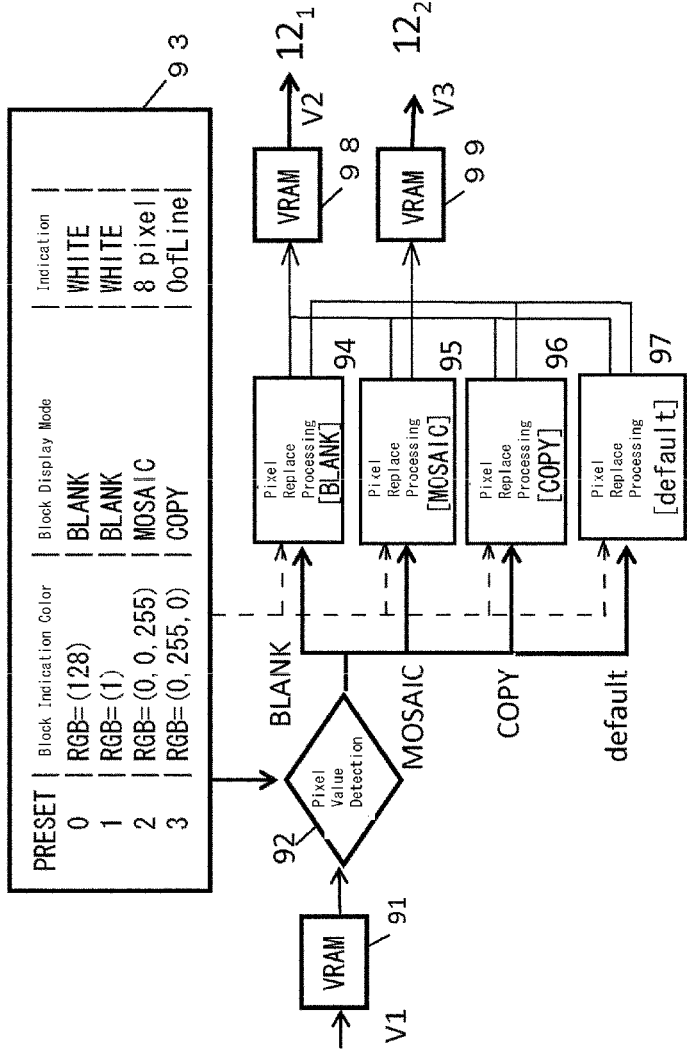
FIG. 22 A block diagram of assembled embodiment of the information display system of Example 6 of the present invention.

The information display system described above may be applied to fields handling the privacy information such as a medical field, a government field, and a legal field etc. Herein below, the medical field may be explained as an example. FIG. 22 shows a construction of a video controller which is a principal part for the application of this invention to the field handling the privacy information. The video controller receives video signals in the images (main images) which are seen by users in application operations of table calculations or database applications etc. executed in the external terminals and then the sub-image V3 is generated without particular operations by a user only by one computer and the video controller to supply the main image V2 and the sub-image V3 to the luminance modification part $12_1, 12_2$ in FIG. 1. The video controller is a general naming of an intermediate processor between the video memory and displaying image on the display device in the terminal such as a personal computer (PC) and normally means a processing system for executing signal processing to the video memory in the display apparatus. Here, in this example, it is assumed that the embodiment in which the video controller is implemented as an individual video controller; however, the video controller may be implemented as the component of the image processing part 10, a video card driver connected to PC etc. while one of the application processing is executed in one PC etc., a shader program operated in GPU equipped on the video card, or a program on the video card connected to two lined display apparatus to supply their outputs to the projector $22_1, 22_2$ in FIG. 1.

This video controller comprises the frame buffer (VRAM) 91 for keeping input video signals, the pixel value detection part 92 for selecting processing depending on each pixel value in the video signal V1 depending on the information stored in the block information setting table (block information setting TBL) 93, the pixel replace processing part [BLANK] 94 for processing of each video signal V1 depending on the result of determination of the pixel value detection part 92, the pixel replace processing part [MOSAIC] 95, the pixel replace processing part [COPY] 96, the pixel replace processing part [default] 97, the flame buffer (VRAM) 98 for keeping the video signal V2 of the main image for output, and the frame buffer (VRAM) 99 for keeping the video signal V2 of the main image for output.

The video signal V1 is the signal sent to the display as normally analog or digital image signals. The video signal V1 supplied to the video controller is accumulated in VRAM 91. The pixel value detection part 92 refers the block information setting table 93 defined beforehand and when the pixel values stored in the VRAM 91 are equal to the "block indicated color", the pixel value detection part 92 makes execute the processing of the pixel replace processing part [BLANK] 94-pixel replace processing part [default] 97 according to the "display mode under block" defined in the block information setting table 93 to generate the video signal V2 of the main image and the video signal V3 of the sub-image to output them through VRAM 98, VRAM 99. Here, the function for setting the block information setting table 93 is implemented as the video controller's function and the video signal V1 of main image or the video signal V2 are output beforehand and then displayed to users through the projector $22_1, 22_2$ so as to allow setting by the operation from users, or alternatively to store in the video controller by a sophisticated utility software run on PC for changing the settings beforehand.

Figure 23:
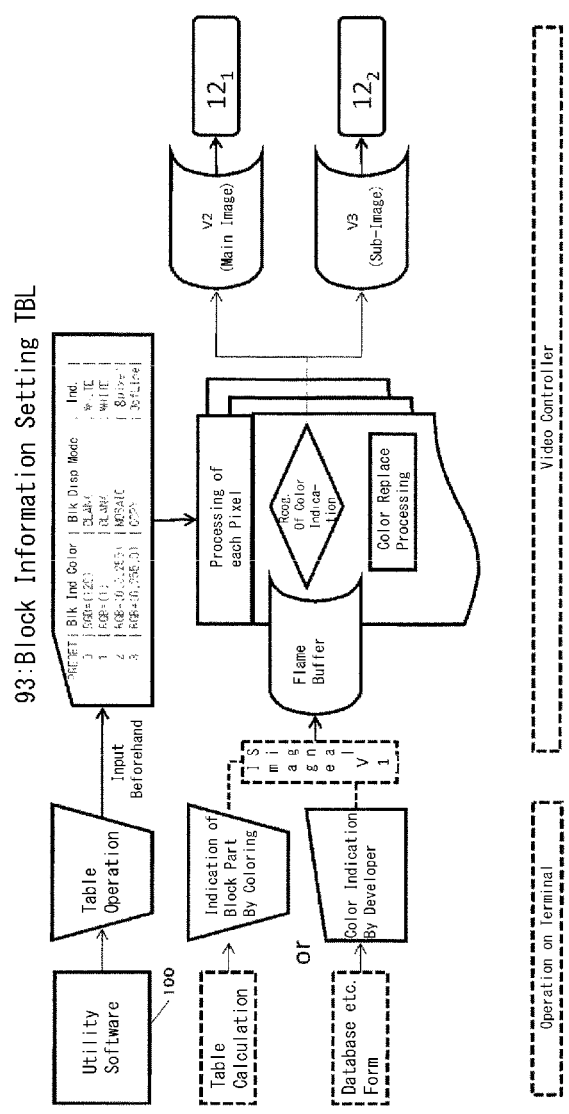
FIG. 23 A drawing of an embodiment of the image processing.
Figure 24:
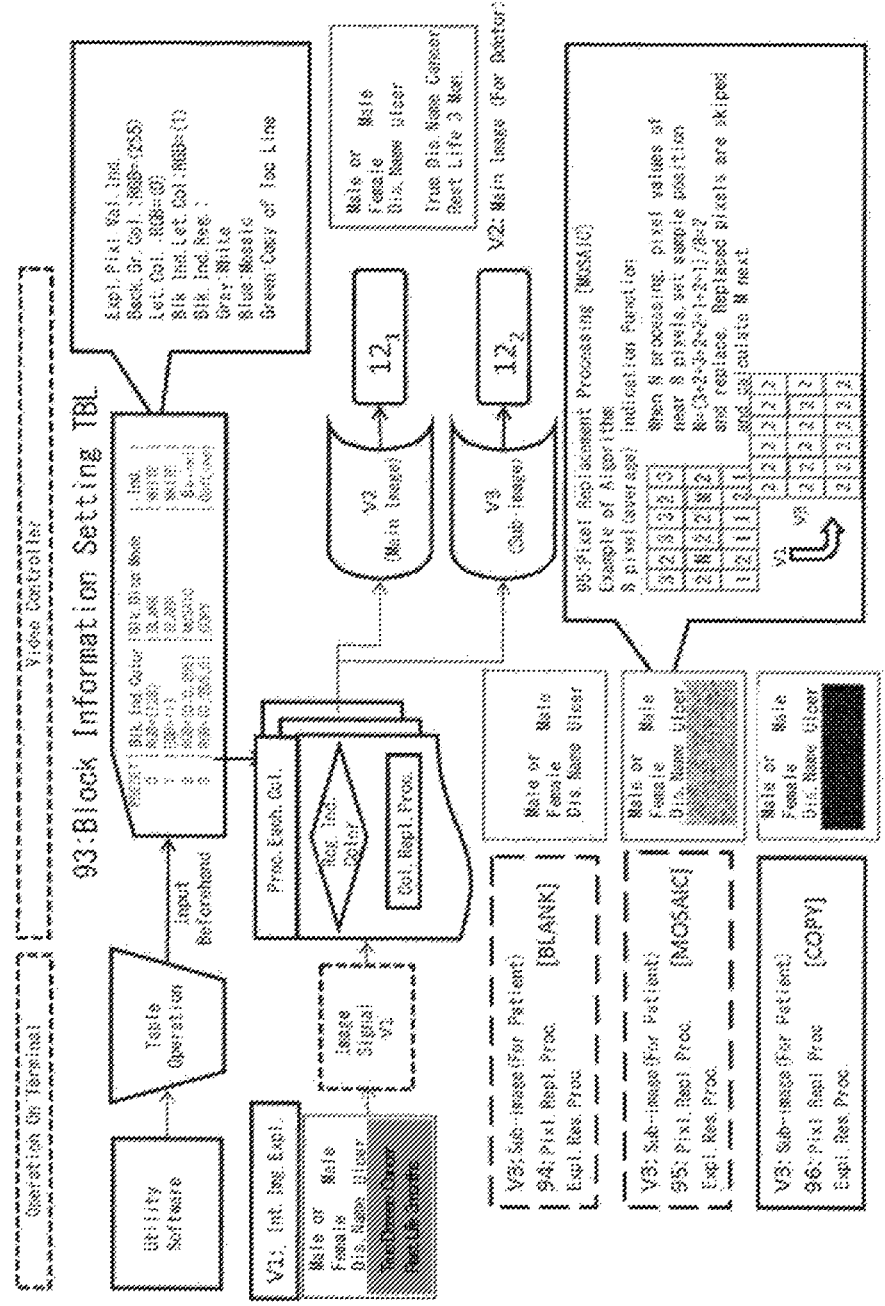
FIG. 24 A drawing of an embodiment of the processing.

FIG. 23 explains a flow of the processing of the video controller and FIG. 24 explains a practical function embodiment and an embodiment of the result of processing. The system developer etc. in a form input screen of the database etc. indicates beforehand the color under block. The user of the application such as the table calculation indicates regions and letter color to be blocked according to the processing result to be displayed in the sub-image as the block indicated color indicated in the block information setting table 93 beforehand. The pixel value detection part 92 in FIG. 22 judges the indicated color with comparing block indicated color set by the block information setting table 93 for every pixel in the video signal V1 stored in VRAM 91 and then makes execute the following color replace processing depending on the judgment results (corresponding to pixel replace processing [BLANK] 94-pixel replace processing [default] 97 in FIG. 22) to output the video signal V1 of the main image and the video signal of the sub-image through VRAM 98, VRAM 99. Now, when the colors are not equal to the block indicated color in the block information setting table 93, the pixel values being same as the input is output as the video signal V2 of the main image and video signal of the sub-image through VRAM 98, VRAM 99 by the pixel replace processing part [default] 97.

In FIG. 24 as for example, the example that the processing of three types of "block display mode" [BLANK, MOSAIC, COPY] are indicated gray, blue, and green respectively and block indicated letter color RGB=(1,1,1) is indicated is explained. When the pixel value being not categorized into the modes, the pixel value in the input video signal V1 may be set as the pixel values of the video signal V2 of the main image and the video signal V3 of the sub-image as is to VRAM 98, VRAM 99.

When the judged pixel values correspond to the value of [BLANK] in the block information setting table 93 (RGB=128: R, G, B values are all "128"), the pixel replace processing part [BLANK] 94 executes the processing to generate the pixel values of the video signal V3 of the sub-image such that presence of the indicated color and block indicated letter color may not be recognized as blank by replacing the region color and the letter color with the same indicated color. Here, in the block information setting table 93 shown in FIG. 22-FIG. 24, the "indication" of corresponding processing is indicated by "white". In this case, the corresponding pixel values in this case gray are replaced with white. As the letter color in the region in which the letters are displayed, when the block indicated letter color (here, for example, RGB=(1: R, G, B values are all "1")) is indicated, replacement is made in the similar indicated color. As the result, the region and letters block indicated color may be white being same as the background color such that the naked eyes can not recognize the region and letters when projected on the screen 24.

When the judged pixel values correspond to the values of [MOSAIC] in the block information setting table 93 to be (RGB=(0, 0, 255)), the pixel detection part 92 makes the pixel replace processing part [MOSAIC] 95 to execute the block processing for the degree that some what scrambling may be confirmed in the sub-image V3. To the pixels equal to the block indicated color in the block information setting table 93, the pixel values near about the objected pixel are referred from VRAM 91 and the pixel values around the objected pixel are replaced. The example for "indicated" is provided with "8 pixel". In this case, adjacent 3 pixels regular square lattices total in 8 around pixel values are sampled and averaged in the replacement in the mosaic processing. This "indicated" may be (sampling 5 pixel regular square lattice) 24 pixel, MED, MEAN, GAUSS, RAND etc. and intensities and algorism of the blocking may be changed. The algorism of the mosaic processing may be replaced with median, average of samples, Gaussian, or random etc. which are effective for blocking and then, the processing may not be every pixel processing depending on the indicated processing algorism. Besides, this "indicated" may be provided with multi step values or patterns being user indicated through the utility software.

When the judged pixel values correspond to the values of [COPY] (RGB=(0,255,0)), the pixel value detection part 92 makes the pixel replace processing part [COPY] 96 copy any pixel values to the pixel color in the sub-image during the generation of video signal V3 of the sub-image. For example, in the "indicated" in the block information setting table 93, "0 of line", that is, this indicates that the pixel value at "0th pixel in the same line" (in FIG. 24, black) is copied to set the objected pixel color. This value may be set to colors being user indicated or to processing pattern.

By the above described each of the pixel replace processing part [BLANK]94-pixel replace processing part [default] 97, according to the block display mode corresponding to the block indicated color judged by the pixel value detection part 92, the pixel values of each video signals stored in VRAM 91 are stored in VRAM 98, VRAM 99 to supply to the luminance modification part 12₁,12₂ in FIG. 1 as the video signal V2 of the main image and the video signal V3 of the sub-image.

Here, as the technology for image separation based on colors, there is a well known technology so called chroma key which synthesize a human is cut out and then synthesize with other backgrounds in the television and movie. Particularly this may be implemented by using digital circuits such as comparators, multiplexers, and pixel shader on GPU. In this case, chroma is used as the key for the block color indication so that the color indication in the block information setting table 93 may be set to the color space other than RGB.

(Advantage)

This information display system may generate the sub-image in which a particular color representation is deleted from the main image containing the particular color representation of the application and the main image and the sub-image are supplied to the luminance modification part 121,122 such that the main image is recognized to the observer putting on the eyeglass 30 and the sub-image is recognized to the observer without the eyeglass 30 and hence the advantage that the presence may not be recognized white the region being blocked explicitly.

The operator of the application operates the application while looking the screen 24 with the eyeglass equipped with the polarization filter to input and to operate the information to be blocked such as individual information etc. In the same time, when other observers look the screen 24 in the naked eyes, the information to be blocked may be seen only by the operator.

For example, in the environment that the client and the operator at the same time looks and inputs to the table calculation software and database input form such as doctors, confidence managements, wholesale, the information that does not want to know to the party itself by the system manager beforehand such as rest life, confidence search results, cost price managements may be hidden.

Modification Example

Alternatively, a contact lens comprising the polarization plate instead of the eyeglass 30 may be used. Further alternatively, it may be promoted that signatures or passwords are input without showing the screen to the operator and around clients etc.

EXPLANATION OF SIGN

10—image processing part, 11—luminance detection part, 12₁,12₂—luminance modification part, 13—correction image generation part, 20—display part, 22₁,22₂,22₃—projector, 23₁, 23₂—polarization plate, 24—screen, 30—eyeglass, 31 polarization plate

The invention claimed is:

1. A method for displaying information comprising a main image and a sub-image (A), comprising:
   modifying tone values to compress the tone of the main image according to a formula (1);

$$b' = b \times \frac{a_{min}}{255} + U \quad (1)$$

wherein b' and b are the luminance values of each pixel the main image after and before compression, respectively, and $a_{min}$ is an offset value to be used when a sub-image (A) tone value is modified and U is a parameter for correcting the luminance levels of projectors;
   projecting by a first projector the main image compressed with tones through a first polarization component;
   modifying tone values of the sub-image (A) for correcting tones of the sub-image according to a formula (2);

$$a' = a \times \frac{255 - a_{min}}{255} + a_{min} + T \quad (2)$$

wherein a' and a are the luminance values of each of pixel of each of a modified sub-image (A') and the original sub-image (A), respectively and T is a parameter for correcting the luminance levels of projectors;
   generating a correction image according to a formula (3);

$$c = (a'^\gamma - b'^\gamma)^{\frac{1}{\gamma}} \quad (3)$$

wherein c is the luminance value of each pixel of the correction image and γ is the γ value of a projector for projecting a correction image; and
   projecting by a second projector the correction image with a second polarization component different from the first polarization component over the main image with compressed tone projected by the first projector such that the main image is buried by an overlapped projection of the main image and the correction image generated by using the sub-image and the offset value to provide the sub-image to a viewer with a naked eye and to provide the main image to another viewer with a polarizer.

2. The method of claim 1, wherein the method further comprises mutually converting luminance values of the image to intensities of the images projected on a screen, and the tone value comprises the tone value in the intensity converted by the luminance value of the image by conversion of the luminance values.

3. The method of claim 1, wherein the second polarization component of the second projector blocks the polarization component of the image projected by the second projector.

4. The method of claim 1, wherein the correction image allows the correction image to be viewed with the naked eye and allows the main image to be viewed through a polarized eyeglass which passes the polarization component of the image projected by the first projector while blocking the polarization component of the image projected by the second projector.

5. A non-transitory computer-readable recording medium recording a program for displaying information on a screen, comprising a main image and a sub-image (A), the program causing a computer to perform comprising:

a program code to modify tone values to compress the tone of the main image according to a formula (1);

$$b' = b \times \frac{a_{min}}{255} + U \quad (1)$$

wherein b' and b are the luminance values of each pixel of each of the main image after and before compression, respectively, and $a_{min}$ is an offset value to be used when a sub-image (A) tone value is modified and U is a parameter for correcting the luminance levels of projectors;

a program code to project by a first projector the main image compressed with tones through a first polarization component;

a program code to modify tone values of the sub-image (A) for correcting tones of the sub-image according to a formula (2);

$$a' = a \times \frac{255 - a_{min}}{255} + a_{min} + T \quad (2)$$

wherein a' and a are the luminance values of each of pixel of each of a modified sub-image (A') and the original sub-image (A), respectively and T is a parameter for correcting the luminance levels of projectors;

a program code to generate a correction image according to a formula (3);

$$c = (a'^\gamma - b'^\gamma)^{\frac{1}{\gamma}} \quad (3)$$

wherein c is the luminance value of each pixel of the correction image and γ is the γ value of a projector for projecting a correction image; and a program code to project by a second projector the correction image with a second polarization component different from the first polarization component over the main image with compressed tone projected by the first projector such that the main image is buried by an overlapped projection of the main image and the correction image generated by using the sub-image and the offset value to provide the sub-image to a viewer with a naked eye and to provide the main image to another viewer with a polarizer.

6. The program product of claim 5, wherein the program further comprises a program code to mutually convert luminance values of the image to intensities of the images projected on a screen, and the tone value comprises the tone value in the intensity converted by the luminance value of the image by conversion of the luminance values.

7. The program product of claim 5, wherein the second polarization component of the second projector blocks the polarization component of the image projected by the second projector.

8. The program product of claim 5, wherein the correction image allows the correction image to be viewed with the naked eye and allows the main image to be viewed through a polarized eyeglass which passes the polarization component of the image projected by the first projector while blocking the polarization component of the image projected by the second projector.

\* \* \* \* \*